US011936410B2

(12) United States Patent
Meir et al.

(10) Patent No.: US 11,936,410 B2
(45) Date of Patent: Mar. 19, 2024

(54) POWER AMPLIFIER MODEL ESTIMATION FOR DIGITAL POST DISTORTION IN MULTI-ANTENNA DEVICES

(71) Applicant: QUALCOMM Incorporated, San Diego, CA (US)

(72) Inventors: Elad Meir, Ramat Gan (IL); Gideon Shlomo Kutz, Ramat Hasharon (IL); Assaf Touboul, Netanya (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/531,499

(22) Filed: Nov. 19, 2021

(65) Prior Publication Data
US 2023/0163794 A1    May 25, 2023

(51) Int. Cl.
H04B 1/04   (2006.01)
H04B 7/06   (2006.01)

(52) U.S. Cl.
CPC ............ H04B 1/0475 (2013.01); H04B 7/06 (2013.01)

(58) Field of Classification Search
None
See application file for complete search history.

(56) References Cited

U.S. PATENT DOCUMENTS

| | | | |
|---|---|---|---|
| 11,283,666 B1* | 3/2022 | McCormick | H03F 3/19 |
| 11,605,887 B1* | 3/2023 | Sharma | H04B 7/18515 |
| 2012/0275414 A1* | 11/2012 | Hu | H04B 7/0452 |
| | | | 370/329 |
| 2012/0328050 A1* | 12/2012 | Bai | H03F 3/195 |
| | | | 455/114.3 |
| 2017/0279640 A1* | 9/2017 | Yang | H04L 1/0003 |
| 2019/0058545 A1* | 2/2019 | Chen | H04L 1/0036 |
| 2021/0359731 A1* | 11/2021 | Sahraei | H04B 7/0465 |
| 2022/0166389 A1* | 5/2022 | Hamid | H04B 7/0617 |
| 2023/0198691 A1* | 6/2023 | Berg | H04L 5/0051 |
| | | | 370/330 |

FOREIGN PATENT DOCUMENTS

| WO | WO-2022073615 A1 * | 4/2022 |
|---|---|---|
| WO | WO-2022247655 A1 * | 12/2022 |

* cited by examiner

Primary Examiner — Gennadiy Tsvey
(74) Attorney, Agent, or Firm — Holland & Hart LLP

(57) ABSTRACT

Methods, systems, and devices for wireless communications are described. The methods include a base station mapping transmitter antennas to one of a set of multiple antenna groups based on a power amplifier response of one or more transmitter antennas, determining a power amplifier model for one or more antenna groups based on the power amplifier response of the one or more transmitter antennas, and transmitting an indication of the power amplifier model for one or more antenna groups to a UE. The methods include the UE determining a power amplifier model for a transmitter antenna of the set of transmitter antennas based on the indication of the power amplifier model and communicating with the base station based on the power amplifier model for the transmitter antenna.

30 Claims, 15 Drawing Sheets

POWER AMPLIFIER MODEL ESTIMATION FOR DIGITAL POST DISTORTION IN MULTI-ANTENNA DEVICES

FIELD OF TECHNOLOGY

The following relates to wireless communications, including power amplifier model estimation for digital post distortion in multi-antenna devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power amplifier model estimation for digital post distortion in multi-antenna devices. Generally, the described techniques provide for a base station determining a power amplifier response of one or more transmitter antennas, if not each transmitter antenna, of the base station and mapping one or more transmitter antennas, if not each transmitter antenna, to at least one of several antenna groups based on similar power amplifier responses. The base station may map a first set of one or more transmitter antennas with similar power amplifier responses to a first antenna group, and map a second set of one or more transmitter antennas with similar power amplifier responses to a second antenna group, etc. Based on the similar power amplifier responses, the base station may determine a first power amplifier model for the first antenna group, and determine a second power amplifier model for the second antenna group, etc. The base station may transmit an indication of the respective power amplifier models of one or more antenna groups, if not each antenna group, to a user equipment (UE). In some cases, the UE may determine a power amplifier model for a transmitter antenna of the set of transmitter antennas based on the indication of the respective power amplifier models, where the transmitter antenna is associated with an antenna group of the multiple antenna groups and the power amplifier model for the transmitter antenna is associated with that same antenna group. In some cases, the UE and the base station may communicate with each other based on the power amplifier model for the one or more transmitter antennas.

A method for wireless communication at a user equipment (UE) is described. The method may include receiving, from a base station, an indication of a power amplifier model for each antenna group of a set of multiple antenna groups, each antenna group being associated with a respective set of transmitter antennas of the base station and a power amplifier response of each transmitter antenna, determining a power amplifier model for a transmitter antenna of the set of transmitter antennas based on the indication of the power amplifier model for an antenna group of the set of multiple antenna groups and the transmitter antenna being associated with the antenna group, and communicating with the base station based on the power amplifier model for the transmitter antenna.

An apparatus for wireless communication at a UE is described. The apparatus may include a processor, memory coupled with the processor, and instructions stored in the memory. The instructions may be executable by the processor to cause the apparatus to receive, from a base station, an indication of a power amplifier model for each antenna group of a set of multiple antenna groups, each antenna group being associated with a respective set of transmitter antennas of the base station and a power amplifier response of each transmitter antenna, determine a power amplifier model for a transmitter antenna of the set of transmitter antennas based on the indication of the power amplifier model for an antenna group of the set of multiple antenna groups and the transmitter antenna being associated with the antenna group, and communicate with the base station based on the power amplifier model for the transmitter antenna.

Another apparatus for wireless communication at a UE is described. The apparatus may include means for receiving, from a base station, an indication of a power amplifier model for each antenna group of a set of multiple antenna groups, each antenna group being associated with a respective set of transmitter antennas of the base station and a power amplifier response of each transmitter antenna, means for determining a power amplifier model for a transmitter antenna of the set of transmitter antennas based on the indication of the power amplifier model for an antenna group of the set of multiple antenna groups and the transmitter antenna being associated with the antenna group, and means for communicating with the base station based on the power amplifier model for the transmitter antenna.

A non-transitory computer-readable medium storing code for wireless communication at a UE is described. The code may include instructions executable by a processor to receive, from a base station, an indication of a power amplifier model for each antenna group of a set of multiple antenna groups, each antenna group being associated with a respective set of transmitter antennas of the base station and a power amplifier response of each transmitter antenna, determine a power amplifier model for a transmitter antenna of the set of transmitter antennas based on the indication of the power amplifier model for an antenna group of the set of multiple antenna groups and the transmitter antenna being associated with the antenna group, and communicate with the base station based on the power amplifier model for the transmitter antenna.

In some examples of the method, apparatuses, and non-transitory computer-readable medium described herein, receiving the indication of the power amplifier model for each antenna group may include operations, features, means, or instructions for receiving a first reference signal for a first antenna group of the set of multiple antenna groups and a second reference signal for a second antenna group of the set of multiple antenna groups, where communicating with the base station may be based on the receiving.

Some examples of the method, apparatuses, and non-transitory computer-readable medium described herein may further include operations, features, means, or instructions for determining a first power amplifier model for the first antenna group based on the first reference signal and a second power amplifier model for the second antenna group based on the second reference signal and applying the first power amplifier model to each transmitter antenna mapped to the first antenna group and the second power amplifier model to each transmitter antenna mapped to the second antenna group, where communicating with the base station may be based on the applying.

In some examples of the method, apparatuses, and non-transitory computer-readable medium described herein, the first reference signal, or the second reference signal, or both include a respective demodulation reference signal.

In some examples of the method, apparatuses, and non-transitory computer-readable medium described herein, receiving the indication of the power amplifier model for each antenna group may include operations, features, means, or instructions for receiving, from the base station, each power amplifier model for each antenna group of the set of multiple antenna groups, where the indication of the power amplifier model may be received in a radio resource control message, and where communicating with the base station may be based on the receiving.

Some examples of the method, apparatuses, and non-transitory computer-readable medium described herein may further include operations, features, means, or instructions for determining that the indication of the power amplifier model indicates which transmitter antennas may be associated with each antenna group of the set of multiple antenna groups and which of the power amplifier models to use for each antenna group, or indicates which of the power amplifier models to use with each antenna group of the set of multiple antenna groups for a given temperature, or indicates both, where communicating with the base station may be based on the determining.

Some examples of the method, apparatuses, and non-transitory computer-readable medium described herein may further include operations, features, means, or instructions for determining that the indication of the power amplifier model indicates a link between a first power amplifier model of a first antenna group of the set of multiple antenna groups and a first set of one or more antenna rows of a precoding matrix, and indicates a link between a second power amplifier model of a second antenna group of the set of multiple antenna groups and a second set of one or more antenna rows of the precoding matrix, where communicating with the base station may be based on the determining.

Some examples of the method, apparatuses, and non-transitory computer-readable medium described herein may further include operations, features, means, or instructions for determining that the indication of the power amplifier model indicates, from a set of one or more linking patterns preconfigured on the UE, a preconfigured linking pattern that links a first power amplifier model of a first antenna group of the set of multiple antenna groups with a first set of one or more antenna rows of a precoding matrix, and links a second power amplifier model of a second antenna group of the set of multiple antenna groups with a second set of one or more antenna rows of the precoding matrix, where communicating with the base station may be based on the determining.

Some examples of the method, apparatuses, and non-transitory computer-readable medium described herein may further include operations, features, means, or instructions for determining that the indication of the power amplifier model indicates a first list of kernels associated with a first power amplifier model of a first antenna group of the set of multiple antenna groups, and a second list of kernels associated with a second power amplifier model of a second antenna group of the set of multiple antenna groups, where communicating with the base station may be based on the determining.

Some examples of the method, apparatuses, and non-transitory computer-readable medium described herein may further include operations, features, means, or instructions for determining that the indication of the power amplifier model indicates a matrix of basis functions respectively associated with the set of multiple antenna groups, where communicating with the base station may be based on the determining.

In some examples of the method, apparatuses, and non-transitory computer-readable medium described herein, communicating with the base station may include operations, features, means, or instructions for implementing a digital post distortion model based on the power amplifier model of the transmitter antenna and performing digital post distortion processing on signals received from the base station based on the digital post distortion model.

A method for wireless communication at a base station is described. The method may include mapping each transmitter antenna of the base station to one of a set of multiple antenna groups based on a power amplifier response of each transmitter antenna, determining a power amplifier model for each antenna group of the set of multiple antenna groups based on the power amplifier response of each transmitter antenna, transmitting an indication of the power amplifier model for each antenna group of the set of multiple antenna groups to a UE, and communicating with the UE based on at least one of the power amplifier models.

An apparatus for wireless communication at a base station is described. The apparatus may include a processor, memory coupled with the processor, and instructions stored in the memory. The instructions may be executable by the processor to cause the apparatus to map each transmitter antenna of the base station to one of a set of multiple antenna groups based on a power amplifier response of each transmitter antenna, determine a power amplifier model for each antenna group of the set of multiple antenna groups based on the power amplifier response of each transmitter antenna, transmit an indication of the power amplifier model for each antenna group of the set of multiple antenna groups to a UE, and communicate with the UE based on at least one of the power amplifier models.

Another apparatus for wireless communication at a base station is described. The apparatus may include means for mapping each transmitter antenna of the base station to one of a set of multiple antenna groups based on a power amplifier response of each transmitter antenna, means for determining a power amplifier model for each antenna group of the set of multiple antenna groups based on the power amplifier response of each transmitter antenna, means for transmitting an indication of the power amplifier model for each antenna group of the set of multiple antenna groups to a UE, and means for communicating with the UE based on at least one of the power amplifier models.

A non-transitory computer-readable medium storing code for wireless communication at a base station is described. The code may include instructions executable by a processor to map each transmitter antenna of the base station to one of a set of multiple antenna groups based on a power amplifier response of each transmitter antenna, determine a power amplifier model for each antenna group of the set of multiple antenna groups based on the power amplifier response of each transmitter antenna, transmit an indication of the power amplifier model for each antenna group of the set of multiple antenna groups to a UE, and communicate with the UE based on at least one of the power amplifier models.

Some examples of the method, apparatuses, and non-transitory computer-readable medium described herein may further include operations, features, means, or instructions for transmitting a first reference signal for a first antenna group of the set of multiple antenna groups and a second reference signal for a second antenna group of the set of multiple antenna groups, where communicating with the UE may be based on the transmitting.

In some examples of the method, apparatuses, and non-transitory computer-readable medium described herein, frequency domain multiplexing a first antenna port of the first reference signal with a second antenna port of the second reference signal, where communicating with the UE may be based on the frequency domain multiplexing.

Some examples of the method, apparatuses, and non-transitory computer-readable medium described herein may further include operations, features, means, or instructions for using each transmitter antenna of a first group of antennas of the set of multiple antenna groups to form a first beam associated with the first reference signal and using each transmitter antenna of a second group of antennas of the set of multiple antenna groups to form a second beam associated with the second reference signal, where communicating with the UE may be based on the forming the first beam and the forming the second beam.

In some examples of the method, apparatuses, and non-transitory computer-readable medium described herein, the first reference signal, or the second reference signal, or both include a respective demodulation reference signal.

Some examples of the method, apparatuses, and non-transitory computer-readable medium described herein may further include operations, features, means, or instructions for transmitting, to the UE, each power amplifier model for each antenna group of the set of multiple antenna groups, where the indication of the power amplifier model may be transmitted in a radio resource control message, and where communicating with the UE may be based on the transmitting.

Some examples of the method, apparatuses, and non-transitory computer-readable medium described herein may further include operations, features, means, or instructions for indicating in the indication of the power amplifier model which transmitter antennas may be associated with each antenna group of the set of multiple antenna groups and which of the power amplifier models to use for each antenna group, or which of the power amplifier models to use with each antenna group of the set of multiple antenna groups for a given temperature, or both.

Some examples of the method, apparatuses, and non-transitory computer-readable medium described herein may further include operations, features, means, or instructions for indicating in the indication of the power amplifier model a link between a first power amplifier model of a first antenna group of the set of multiple antenna groups and a first set of one or more antenna rows of a precoding matrix and a link between a second power amplifier model of a second antenna group of the set of multiple antenna groups and a second set of one or more antenna rows of the precoding matrix.

Some examples of the method, apparatuses, and non-transitory computer-readable medium described herein may further include operations, features, means, or instructions for indicating in the indication of the power amplifier model a preconfigured linking pattern, from a set of one or more linking patterns preconfigured on the UE, that links a first power amplifier model of a first antenna group of the set of multiple antenna groups with a first set of one or more antenna rows of a precoding matrix, and links a second power amplifier model of a second antenna group of the set of multiple antenna groups with a second set of one or more antenna rows of the precoding matrix.

In some examples of the method, apparatuses, and non-transitory computer-readable medium described herein, determining the power amplifier model of each antenna group may include operations, features, means, or instructions for converting a first power amplifier model of a first antenna group of the set of multiple antenna groups into a first list of kernels and converting a second power amplifier model of a second antenna group of the set of multiple antenna groups into a second list of kernels.

In some examples of the method, apparatuses, and non-transitory computer-readable medium described herein, transmitting the indication of the power amplifier model of each antenna group may include operations, features, means, or instructions for transmitting at least the first list of kernels and the second list of kernels to the UE.

In some examples of the method, apparatuses, and non-transitory computer-readable medium described herein, determining the power amplifier model of each antenna group may include operations, features, means, or instructions for projecting coefficients of the power amplifier model of each transmitter antenna onto a reduced set of basis functions and determining a matrix of basis functions based on the projecting.

In some examples of the method, apparatuses, and non-transitory computer-readable medium described herein, transmitting the indication of the power amplifier model of each antenna group may include operations, features, means, or instructions for transmitting the matrix of basis functions to the UE.

DETAILED DESCRIPTION

Figure 1:
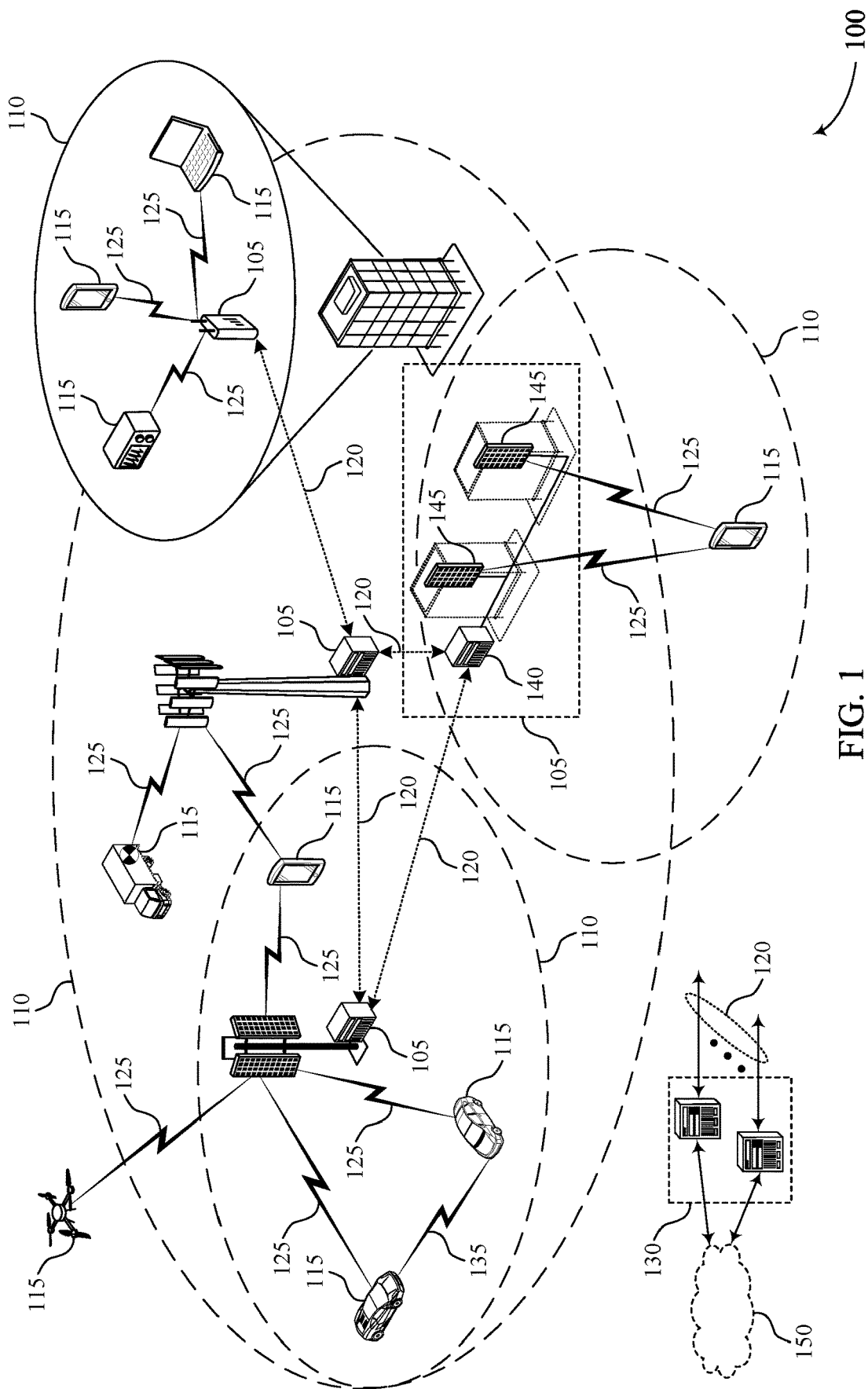
FIG. 1 illustrates an example of a wireless communications system that supports power amplifier model estimation for digital post distortion in multi-antenna devices in accordance with aspects of the present disclosure.

The present techniques relate to power amplifier model estimation for digital post distortion in multi-antenna device. Some signals, such as wideband signals, are spectrally more efficient than others. However, these signals, such as the wideband signals, may be applied by power amplifiers (PAs), which are inherently nonlinear. The nonlinearity of PAs, in some examples, generates spectral re-growth, which leads to adjacent channel interference and violations of out-of-band emission constraints set by regulatory bodies, among other issues. The nonlinearity of the PAs also may cause in-band distortion, which degrades the bit error rate (BER) performance. In some cases, a receiver device (e.g., a user equipment (UE)) may perform digital post distortion processing to estimate the non-linearity and compensate accordingly. However, some base stations (e.g., 5G NR base stations) may include an antenna array that is configured with a relatively large number of antennas. In some cases, digital post distortion processing may be performed on each transmitter antenna, but performing digital post distortion processing on such relatively large transmit antenna arrays may result in relatively large numbers of operations, such as calculations. In some cases, the computational costs of the non-linearity estimation on such relatively large transmit antenna arrays may be impractical due to the adverse effects these computational costs could have on the performance of associated devices, quality of service, and user experience.

The techniques described herein enable a device, such as a base station, to efficiently transmit power amplifier models to a user equipment (UE) so that the UE may use the power amplifier models to compensate for power amplifier characteristics, such as non-linearity (e.g., non-linearity remaining after digital predistortion). The described techniques relate to combining transmitter antennas into groups of antennas based on a similarity between power amplifier models of the respective transmitter antennas. For example, in some cases, a power amplifier response (e.g., power amplifier output power relative to power amplifier input power) of a first transmitter antenna may be relatively similar to a power amplifier response of a second transmitter antenna, and a power amplifier response of a third transmitter antenna may be relatively similar to a power amplifier response of a fourth transmitter antenna. In some cases, the similarity between a first power amplifier response and a second power amplifier response may be based on the power amplifier output power levels of the second power amplifier response being within a set threshold of the power amplifier output power levels of the first power amplifier response for a set of power amplifier input power levels. Based on the described techniques, a base station may group the first transmitter antenna and second transmitter antenna in a first antenna group, and group the third transmitter antenna and fourth transmitter antenna in a second antenna group separate from the first antenna group. Accordingly, instead of transmitting a power amplifier model for each transmitter antenna based on the power amplifier response of each transmitter antenna, the base station may transmit a power amplifier model (e.g., an indication of a power amplifier model) for at least some antenna groups, if not each antenna group (e.g., transmit a first power amplifier model for the first antenna group of antennas and a second power amplifier model for the second antenna group of antennas). In some cases, a UE may perform digital post distortion processing on signals received from the base station based on the indicated power amplifier models.

Aspects of the subject matter described herein may be implemented to realize one or more advantages. The described techniques may support improvements in system efficiency in association with a device performing digital post distortion processing. Additionally, the described techniques may result in decreasing system latency, increasing device performance, increasing the reliability of digital post distortion processing, and thus improving quality of service and user experience, among other advantages.

Aspects of the disclosure are initially described in the context of wireless communications systems. Aspects of the disclosure are further illustrated by and described with reference to additional examples of the wireless communications systems as well as process flows that relate to power amplifier model estimation for digital post distortion in multi-antenna device. Aspects of the disclosure are further illustrated by and described with reference to apparatus diagrams, system diagrams, and flowcharts that relate to power amplifier model estimation for digital post distortion in multi-antenna device.

FIG. 1 illustrates an example of a wireless communications system 100 that supports power amplifier model estimation for digital post distortion in multi-antenna devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels.

The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may determine a power amplifier response of each transmitter antenna of the base station 105. The base station 105 may compare the power amplifier responses of each transmitter antenna. For example, the base station 105 may compare the power amplifier response of a first transmitter antenna to the power amplifier response of a second transmitter antenna, the power amplifier response of a third transmitter antenna, or the power amplifier response of a fourth transmitter antenna, of any combination thereof. In some cases, the base station 105 may compare the power amplifier response of the second transmitter antenna to the power amplifier response of the first transmitter antenna, the power amplifier response of the third transmitter antenna, or the power amplifier response of the fourth transmitter antenna, of any combination thereof. In some examples, the base station 105 may determine that the power amplifier response of the first transmitter antenna is relatively similar to the power amplifier response of the fourth transmitter antenna, and that the power amplifier response of the second transmitter antenna is relatively similar to the power amplifier response of the third transmitter antenna.

In some examples, the base station 105 may map each transmitter antenna to one of several antenna groups based on similarity between respective power amplifier responses. The base station 105 may map a first set of one or more transmitter antennas with similar power amplifier responses (e.g., the first transmitter antenna and the fourth transmitter antenna) to a first antenna group and map a second set of one or more transmitter antennas with similar power amplifier responses (e.g., the second transmitter antenna and the third transmitter antenna) to a second antenna group, etc. Based on the similar power amplifier responses, the base station 105 may determine a first power amplifier model for the first antenna group and determine a second power amplifier model for the second antenna group, and so on. In some cases, the first power amplifier model for the first antenna group may be based on an average of the power amplifier responses of the respective antennas of the first antenna group. In some cases, the second power amplifier model for the second antenna group may be based on an average of the power amplifier responses of the respective antennas of the second antenna group.

In some examples, the base station 105 may transmit an indication of the respective power amplifier models of each antenna group to a UE 115. In some cases, the UE 115 may determine a power amplifier model for a transmitter antenna of the set of transmitter antennas based on the indication of the respective power amplifier models, where the transmitter antenna is associated with an antenna group of the multiple antenna groups and the power amplifier model for the transmitter antenna is associated with that antenna group. In some examples, UE 115 may apply the first power amplifier model of the first antenna group to an antenna of the first antenna group (e.g., to fourth transmitter antenna, etc.). In some cases, the UE 115 and the base station 105 may communicate with each other based on the power amplifier model for the transmitter antenna (e.g., the first power amplifier model for the fourth transmitter antenna).

Figure 2:
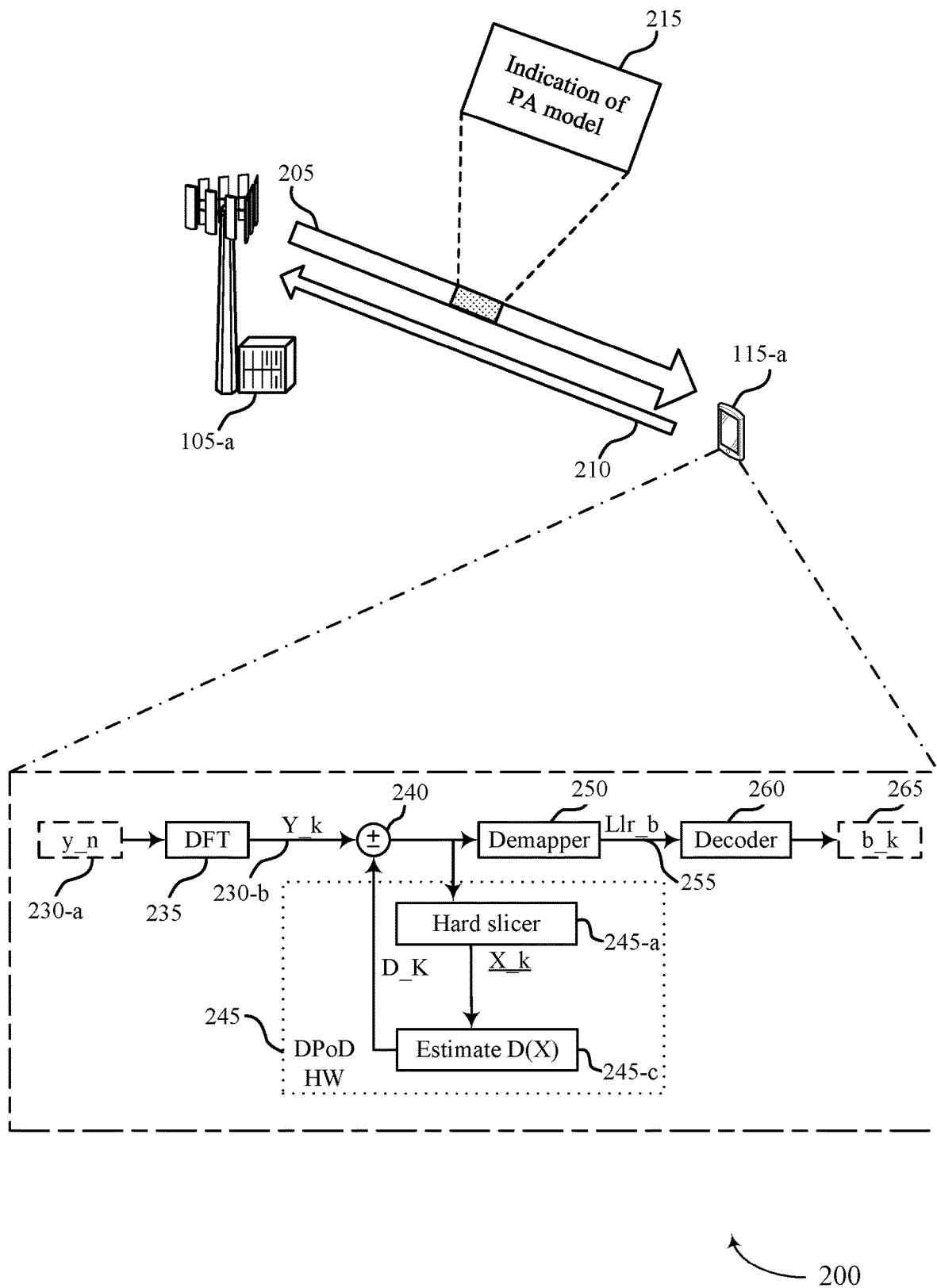
FIG. 2 illustrates an example of a wireless communications system that supports power amplifier model estimation for digital post distortion in multi-antenna devices in accordance with aspects of the present disclosure.

FIG. 2 illustrates an example of a wireless communications system 200 that supports power amplifier model estimation for digital post distortion in multi-antenna devices in accordance with aspects of the present disclosure. In some examples, some aspects of wireless communications system 200 may implement or be implemented by aspects of wireless communications system 100. In the illustrated example, the wireless communications system 200 may include a base station 105-a and a UE 115-a. The base station 105-a and the UE 115-a may be examples of corresponding devices described herein with reference to FIG. 1.

As illustrated, wireless communications system 200 may include downlink 205 and uplink 210. Base station 105-a may use downlink 205 to convey control and/or data information to UE 115-a. And UE 115-a may use uplink 210 to convey control and/or data information to base station 105-a. In some cases, downlink 205 may use different time and/or frequency resources than uplink 210.

In the illustrated example, UE 115-a may receive one or more transmissions from base station 105-a. In some cases, the one or more transmissions may include an indication of a power amplifier model for each antenna group of base station 105-a, where each antenna group includes one or more transmitter antennas of base station 105-a.

In some examples, base station 105-a may analyze power amplifier responses of each transmitter antenna of base station 105-a. In some cases, base station 105-a may compare the respective power amplifier responses to each other and identify which transmitter antennas have relatively similar power amplifier responses. The base station 105-a may map each transmitter antenna of the base station 105-a to one of a set of antenna groups based on a power amplifier response of each transmitter antenna.

In some examples, base station 105-a may determine a power amplifier model for each antenna group of the set of antenna groups based on the respective power amplifier responses associated with each antenna group (e.g., based on the averaged power amplifier response of each antenna group). As shown, base station 105-a may transmit the indication of the power amplifier models 215 for each antenna group of base station 105-a to UE 115-a. In some cases, the indication of the power amplifier models 215 may be signaled via a radio resource control message.

In some examples, the indication of the power amplifier models 215 may be based on or include UE 115-a obtaining power amplifier response through estimation or explicit signaling per group of antennas. In some cases, the indication of the power amplifier models 215 may be based on or include one or more reference signals. In some cases, the one or more reference signals may be demodulation reference signals.

In some cases, base station 105-a may transmit to UE 115-a a first reference signal for a first antenna group of the set of antenna groups and a second reference signal for a second antenna group of the set of antenna groups. The first reference signal, or the second reference signal, or both may be based on or include a respective demodulation reference signal. In some cases, base station 105-a communicating with UE 115-a may be based on base station 105-a transmitting the one or more reference signals.

In some examples, an antenna port of each reference signal may be allocated per group of antennas (e.g., a first antenna port allocated for a first reference signal of a first power amplifier model of a first group of antennas, a second antenna port allocated for a second reference signal of a second power amplifier model of a second group of antennas, etc.). In some cases, UE 115-a may estimate the power amplifier model per group based on each respective reference signal.

In some examples, base station 105-a may multiplex (e.g., frequency domain multiplex) a first antenna port of the first reference signal with a second antenna port of the second reference signal. In some cases, base station 105-a communicating with UE 115-a may be based on the frequency domain multiplexing. In some cases, base station 105-a may frequency domain multiplex respective reference signal ports. In some examples, two reference signal resources on odd and even carriers may be frequency domain multiplexed such that the associated signals with their power amplifier non-linearity are orthogonal to each other.

In some examples, base station 105-a may use each transmitter antenna of a first group of antennas of the set of antenna groups to form a first beam associated with the first reference signal. In some cases, base station 105-a may use each transmitter antenna of a second group of antennas of the set of antenna groups to form a second beam associated with the second reference signal. In some cases, base station 105-a communicating with UE 115-a may be based on base station 105-a forming the first beam and the forming the second beam.

In some examples, base station 105-a may transmit, to the UE 115-a, each power amplifier model for each antenna group of the set of antenna groups (e.g., transmit ten power amplifier models for a total of ten antenna groups). In some cases, the indication of the power amplifier model may be transmitted in a radio resource control message. In some cases, base station 105-a communicating with UE 115-a may be based on base station 105-a transmitting each power amplifier model. In some cases, base station 105-a may transmit explicit signaling to indicate the relevant power amplifier model for UE 115-a to use. In some cases, base station 105-a may transmit a temperature report to UE 115-a, and UE 115-a may select the relevant power amplifier model to use based on the temperature report indicating a mapping between a current temperature and the relevant power amplifier model.

In some examples, base station 105-a may indicate in the indication of the power amplifier model which transmitter antennas are associated with which antenna group of the set of antenna groups and which of the power amplifier models to use for each antenna group, or which of the power amplifier models to use with each antenna group of the set of antenna groups for a given temperature, or a combination thereof.

In some examples, the indication of the power amplifier models 215 may be based on or include a set of links between power amplifier models and antenna groups, each link connecting a respective power amplifier model to an antenna group. Thus, base station 105-a may explicitly indicate relevant power amplifier models based on the set of links between power amplifier models and antenna groups. In some cases, the base station 105-a may indicate multiple sets of links for various operating conditions (e.g., various temperatures, etc.). Thus, the base station 105-a may transmit the indication of the power amplifier models 215 to UE 115-a (e.g., with the one or more sets of links), and UE 115-a may adapt to varying operating conditions by implementing or switching to the relevant power amplifier model per operating condition.

In some examples, base station 105-a may indicate in the indication of the power amplifier model a first link between a first power amplifier model of a first antenna group of the set of antenna groups and a first set of one or more antenna rows of a precoding matrix and a second link between a second power amplifier model of a second antenna group of the set of antenna groups and a second set of one or more antenna rows of the precoding matrix. In some cases, each precoding matrix row corresponds to a single transmitting antenna of base station 105-a. When a power amplifier model applies to a group of antennas the same power amplifier model may correspond to a corresponding set of precoding matrix rows. Thus, a first group of three antennas may correspond to three precoding matrix rows, a second group of one antenna may correspond to one precoding matrix row, a third group of two antennas may correspond to two precoding matrix rows, etc.

In some examples, base station 105-*a* may indicate in the indication of the power amplifier model a preconfigured linking pattern, from a set of one or more linking patterns preconfigured on the UE 115-*a*. In some cases, the base station 105-*a* may implicitly indicate relevant power amplifier models based on the preconfigured linking pattern. In some cases, the preconfigured linking pattern may link a first power amplifier model of a first antenna group of the set of antenna groups with a first set of one or more antenna rows of a precoding matrix, and link a second power amplifier model of a second antenna group of the set of antenna groups with a second set of one or more antenna rows of the precoding matrix.

In some examples, the indication of the power amplifier models 215 may be based on or include a list of kernels (e.g., coefficients) associated with a digital post distortion model (e.g., a digital post distortion model based on the respective power amplifier models indicated in the indication of the power amplifier models 215). In some cases, base station 105-*a* may convert a first power amplifier model of a first antenna group of the set of antenna groups into a first list of kernels, and convert a second power amplifier model of a second antenna group of the set of antenna groups into a second list of kernels. In some cases, base station 105-*a* may transmit at least the first list of kernels and the second list of kernels to the UE 115-*a*.

In some examples, UE 115-*a* may receive the list of kernels and analyze the list of kernels. In some cases, UE 115-*a* may determine respective power amplifier models based on the list of kernels. In some cases, the base station 105-*a* may indicate multiple lists of kernels for various operating conditions (e.g., various temperatures, etc.). Thus, the base station 105-*a* may transmit the indication of the power amplifier models 215 to UE 115-*a* (e.g., with the one or more lists of kernels), and UE 115-*a* may adapt to varying operating conditions by implementing or switching to the relevant power amplifier model per operating condition according to which list of kernels applies to the given operating condition.

In some examples, the indication of the power amplifier models 215 may be based on or include a matrix of basis functions. The total number of reference signal resources for a set of transmitter antennas of base station 105-*a* may be linearly proportional to the product of the total number of transmitter antennas and the number of kernels per transmitter antenna. However, based on the similarity or correlation between power amplifier models, the kernels (e.g., power amplifier model coefficients) may be projected onto a reduced set of basis functions (e.g., reduced according to similar power amplifier responses) instead of the full set of basis functions for every power amplifier response of every transmitter antenna. In some cases, base station 105-*a* may generate an overall number of basis functions for the transmitter antennas. In some cases, the reduced set of basis functions may be a subset of the overall number of basis functions. In some cases, base station 105-*a* may select the reduced set of basis functions based on respective similarity of power amplifier responses of the transmitter antennas.

As described herein, a set of similar power amplifier responses may be mapped to a single representative power amplifier model, and the representative power amplifier model may be associated with one of the groups of antennas of the set of antenna groups. In some cases, the representative power amplifier model or the respective group of antennas may be associated with at least one basis function (e.g., instead of each antenna of the respective group of antennas being associated with at least one basis function). In some cases, base station 105-*a* may project the kernels (e.g., coefficients of the power amplifier model) of each transmitter antenna onto a reduced set of basis functions (e.g., instead of the kernels of each transmitter antenna being projected onto each basis function of each transmitter antenna). In some cases, base station 105-*a* may determine a matrix of basis functions based on the projecting. In some cases, base station 105-*a* may transmit the matrix of basis functions to the UE 115-*a*.

In some examples, the basis functions may be based on the estimation of power amplifier models according to the following equation:

$$\beta = \mathrm{argmin} \left\| \begin{bmatrix} p_0 \\ \vdots \\ p_{Ntx-1} \end{bmatrix} - \begin{bmatrix} A_0 & \cdots & 0 \\ \vdots & \ddots & \vdots \\ 0 & \cdots & A_{tx-1} \end{bmatrix} B\beta \right\|^2$$

where tx is the number of transmitter antennas of base station 105-*a* (e.g., the number of power amplifiers to estimate); B is the basis function matrix (e.g., (tx·K)·(L·K)) that projects, for each of the kernels, the tx power amplifier coefficients to L basis functions, where L is less than tx; $\beta$ is the (L·K) vector of basis functions coefficients; K is the number of kernels used per power amplifier model; $f_k$ is the k-th kernel function; and $p_{n,m}$ is a vector of received pilots around the m-th pilot element sent from the n-th power amplifier.

In some examples, the product B·$\beta$ is equivalent to a single column matrix [$\alpha_0$ to $\alpha_{tx-1}$] as indicated in the following:

$$B\beta \equiv \begin{bmatrix} \alpha_0 \\ \vdots \\ \alpha_{tx-1} \end{bmatrix}$$

where the column matrix of $\alpha$ values represent the power amplifier response of the tx transmitter antennas. Thus, the product B·$\beta$ replaces the power amplifier response of each antenna (e.g., from $\alpha_0$ to $\alpha_{tx-1}$), such that the n-th power amplifier is modeled according to the following equation:

$$PA_n(x) = \sum_k \alpha_{n,k} f_k(x)$$

In some examples, UE 115-*a* is preconfigured with the basis functions of the respective power amplifier responses or are signaled by base station 105-*a* (e.g., via the indication of the power amplifier models 215). In some cases, UE 115-*a* determines how to combine the kernels for each transmitter antenna (e.g., coefficients of respective power amplifier models). Once base station 105-*a* determines the respective power amplifier responses of each transmitter antenna, base station 105-*a* may reduce the set of power amplifier responses down to two or more groups of power amplifier responses based on respective similarity between power amplifier responses. The base station 105-*a* may then determine a power amplifier model for each group of power amplifier responses. Thus, β represents a vector of coefficients of basis functions based on the group of power amplifier responses (e.g., based on each power amplifier model representative of each group of power amplifier responses), and B represents some known basis function matrix according to the correlation of transmitter antennas into groups of antennas (e.g., according to the similarity between power amplifier responses of each group of antennas).

As indicated, B may represent a matrix of basis functions that base station 105-a may signal to UE 115-a (e.g., signal to digital post distortion-capable UEs). In some cases, the a matrix of basis functions may be signaled via a radio resource control message. In some cases, UE 115-a may perform repeated estimations of power amplifier models per temperature per band, per transmitting power, etc., based on the same underlying basis functions matrix B. In some cases, UE 115-a may receive basis functions matrix B and adjust power amplifier models based on fluctuations in temperature per band, transmitting power per antenna, etc., based on the basis functions matrix B.

In some examples, UE 115-a may receive implicit (e.g., via the indication of the power amplifier models 215 or configured before the indication of the power amplifier models 215, or a combination thereof) or explicit signaling (e.g., via the indication of the power amplifier models 215) regarding the mapping of power amplifiers among antenna groups and the relation between the power amplifier models and blind channel estimation in digital post distortion processing. In some cases, coefficients of a digital post distortion model used in digital post distortion processing may be equivalent to or referred to as coefficients of a power amplifier model. In some cases, a power amplifier model may be equivalent to or referred to as a digital post distortion model. In some cases, UE 115-a may select a power amplifier model and use the coefficients of the selected power amplifier model as coefficients of an associated digital post distortion model.

In some examples, base station 105-a and UE 115-a may communicate with each other based on at least one of the power amplifier models (e.g., based on the indication of the power amplifier models 215). In the illustrated example, the communication between base station 105-a and UE 115-a may include downlink signal. In some cases, the base station 105-a may amplify the downlink signal using a power amplifier. As the power amplifier nears saturation, this may result in a distortion that may generate non-linear noise according to a known model (e.g., power amplifier clipping), by directly affecting the mapped symbols of downlink signal. Thus, aspects of the amplified downlink signal may be distorted. In some cases, base station 105-a may remove non-linear noise from downlink signal. In some other cases, UE 115-a may remove the non-linear noise from the downlink signal. In some cases, UE 115-a may apply a digital post distortion algorithm 245 to the received downlink signal to remove the non-linear noise from the downlink signal. The digital post distortion algorithm 245 may be represented by Equation (1):

$$Y_k = G(X_k) + N_k = \alpha \cdot X_k + D(X_k) + N_k \qquad (1)$$

where α may be a coefficient, such as a Bussgang coefficient, $X_k$ may be the downlink signal, and k may be a delay or time offset as a result of the distortion introduced by the power amplifier. The $\alpha \cdot X_k$ part of the Equation (1) may be a linear portion of the downlink signal and may represent the downlink signal before non-linear noise may have been introduced, for example, by the power amplifier at the base station 105-a. The non-linear model that results from the downlink signal may be represented by D ($X_k$) in the time domain. The non-linear model D ($X_k$) may include odd-order memoryless kernels, such as $x^*|x|^2$ or $x^*|x|^4$, that may represent the power amplifier used at the base station 105-a to amplify the downlink signal. As such, $Y_k$ may represent the non-linearity of the signal $X_k$, which may equate to the sum of the applied kernels, where each kernel has its own coefficient. In some cases, such as large bandwidth or high signal to noise ratio (SNR), memory kernels may also be applied, such as $x[n]^*|x[n-k]|^M$ where k may be a time delay and M may be an even integer.

The UE 115-a may apply the digital post distortion algorithm 245 to the downlink signal one or more times, where each iteration includes performing a hard decision slicing operation 245-a to determine estimated constellation points (e.g., X_k) and estimating nonlinear noise 245-c (e.g., estimate D(X)). In some cases, the digital post distortion algorithm 245, in conjunction with nonlinear noise 245-c, may implement a nonlinear model of a power amplifier. In order to perform the hard decision slicing operation 245-a, the UE 115-a may take the time domain signal 230-a (e.g., y_n) of the downlink signal and apply demodulation operation 235 (e.g., a discrete Fourier transform (DFT)) in order to produce the demodulated downlink signal 230-b (e.g., frequency domain signal Y_k). The UE 115-a may perform the hard decision slicing operation 245-a on the demodulated downlink signal 230-b by comparing each symbol of the demodulated downlink signal 230-b to constellations in a constellation distribution that may be free of impairments and based on a modulation scheme used to modulate the downlink signal.

In some examples, initial iterations of digital post distortion algorithm 245 may be distorted by relatively strong noise due to the non-linearity of the received signal that has not yet been processed (e.g., reduced) by the hard decision slicing performed by digital post distortion algorithm 245 in conjunction with hard slicer 245-a. As shown, the digital post distortion algorithm 245 may provide the estimated nonlinear noise 245-c to adder 240. In some cases, adder 240 may subtract the estimated nonlinear noise 245-c from the demodulated downlink signal 230-b, where the adder 240 provides the difference to the digital post distortion algorithm 245 and the demapper 250. As shown, the frequency-domain signal (e.g., the estimated nonlinear noise 245-c subtracted from the demodulated downlink signal 230-b) may be provided to demapper 250 to extract symbols from the frequency-domain signal. As shown, the demapper 250 may provide the extracted symbols (e.g., "LLR_b 255" based on log-likelihood ratio bits) to a decoder 260. In some cases, the decoder 260 may extract bits (e.g., "b_k 265") from the extracted symbols, and provide the extracted bits b_k 265 as a result of the digital post distortion processing.

In some examples, the wireless communications system 200 may support multiple radio access technologies including 4G systems such as LTE systems, LTE-A systems, or LTE-A Pro systems, and 5G systems, which may be referred to as NR systems. The wireless communications system 200 may also support improvements to power consumption, spectral efficiency, higher data rates and, in some examples, may promote enhanced efficiency for higher reliability and lower latency wireless communications (e.g., uplink transmission, downlink transmission, uplink reception, and downlink reception), among other benefits.

The present techniques may reduce power consumption and free up processing cycles of one or more devices (e.g., battery-operated devices, a UE 115 of FIG. 1, etc.) by reducing system overhead associated with indication of power amplifier models of transmitter antennas. Additionally, described techniques may result in decreasing system latency, decreasing system computational load, and increasing resource utilization efficiency, while increasing spectrum efficiency and improving user experience.

Figure 3:
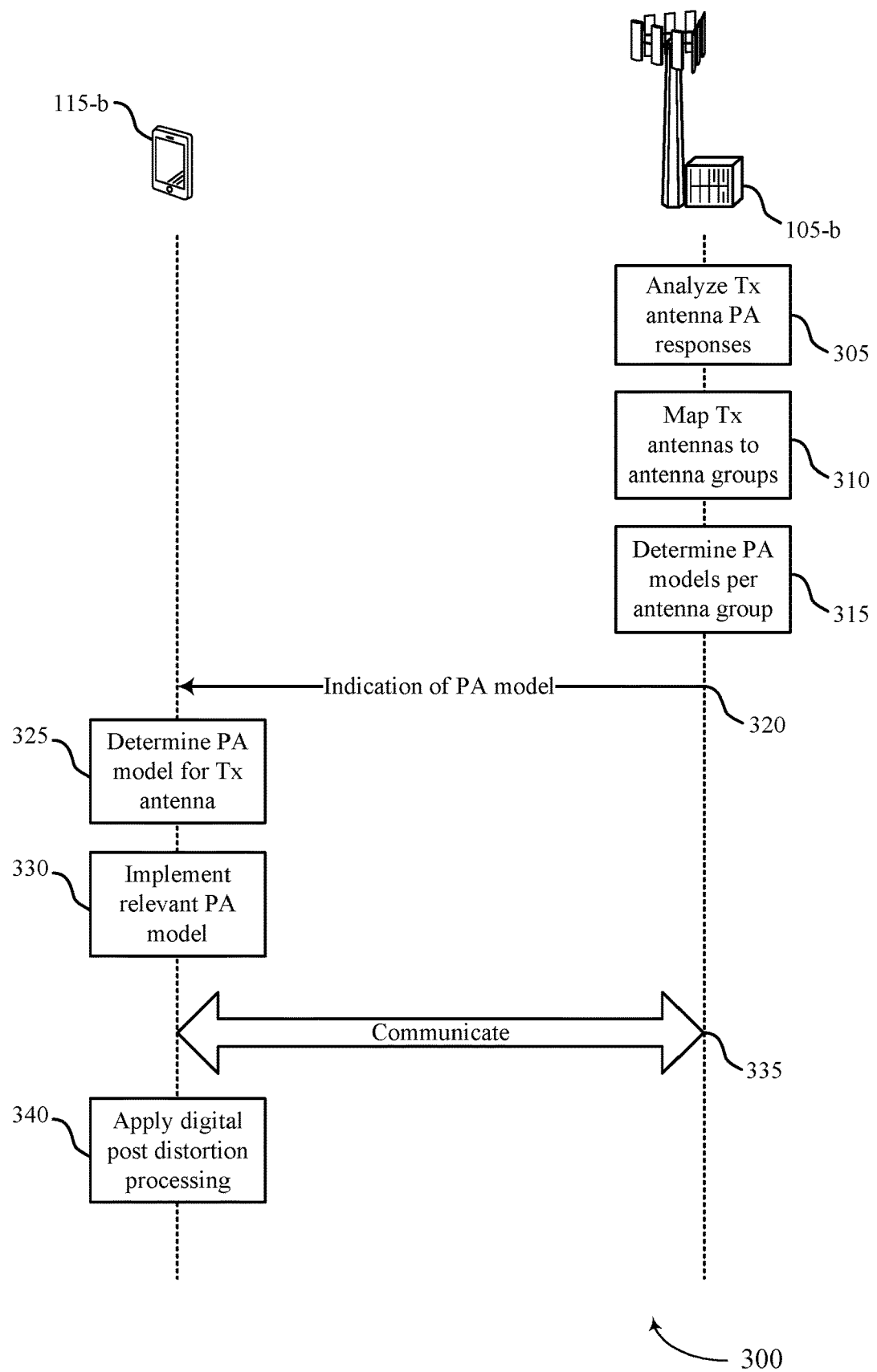
FIG. 3 illustrates an example of a process flow that supports power amplifier model estimation for digital post distortion in multi-antenna devices in accordance with aspects of the present disclosure.

FIG. 3 illustrates an example of a process flow 300 that supports power amplifier model estimation for digital post distortion in multi-antenna devices in accordance with aspects of the present disclosure. In some examples, some aspects of process flow 300 may implement or be implemented by aspects of wireless communications system 100. For example, process flow 300 may include a base station 105-b and a UE 115-b, which may be respective examples of a base station 105 or UE 115 described with reference to FIG. 1.

At 305, base station 105-b may analyze power amplifier responses of each transmitter antenna of base station 105-b. In some cases, the analysis of power amplifier responses may include determining a power amplifier response of each transmitter antenna of the base station 105-b, comparing the power amplifier responses of each transmitter antenna, and grouping transmitter antennas based on similar power amplifier responses.

At 310, base station 105-b may map each transmitter antenna to one of several antenna groups based on similarity between respective power amplifier responses. The base station 105-b may map a first set of one or more transmitter antennas with similar power amplifier responses to a first antenna group and map a second set of one or more transmitter antennas with similar power amplifier responses to a second antenna group, etc.

At 315, base station 105-b may determine a power amplifier model for each group of antennas. In some cases, base station 105-b may determine a first amplifier model for a first group of antennas and a second amplifier model for a second group of antennas. The first amplifier model may be based on base station 105-b analyzing one or more respective power amplifier responses of transmitter antennas associated with the first group of antennas, and the second amplifier model may be based on base station 105-b analyzing one or more respective power amplifier responses of transmitter antennas associated with the second group of antennas.

At 320, base station 105-b may transmit an indication of the respective power amplifier models of each antenna group to a UE 115-b. In some cases, base station 105-b may transmit the indication of the respective power amplifier models via a radio resource control message. In some cases, base station 105-b may transmit the indication of the respective power amplifier models via a radio resource control message, a downlink control information message, or a media access control element message, or any combination thereof.

At 325, UE 115-b may determine at least one power amplifier model of a transmitter antenna of base station 105-b based on the indication of the respective power amplifier models. In some cases, UE 115-b may analyze the indication of the respective power amplifier models and determine an indicated power amplifier model maps to a transmitter antenna based on the indicated power amplifier model and the transmitter antenna both mapping to a same group of antennas.

At 330, UE 115-b may select and implement a selected power amplifier model. In some cases, UE 115-b may implement the selected power amplifier model based on one or more conditions (e.g., based on a current temperature, based on explicit signaling from base station 105-b, etc.). In some cases, UE 115-b may implement the selected power amplifier model with digital post distortion processing.

At 335, UE 115-b and base station 105-b may communicate with each other based on the implemented power amplifier model. In some cases, the communication between UE 115-b and base station 105-b may include control and/or data information communicated from UE 115-b to base station 105-b, or from base station 105-b to UE 115-b, or both.

At 340, UE 115-b may apply digital post distortion processing to communications from base station 105-b. In some cases, UE 115-b may apply digital post distortion processing based on the implemented power amplifier model.

Figure 4:
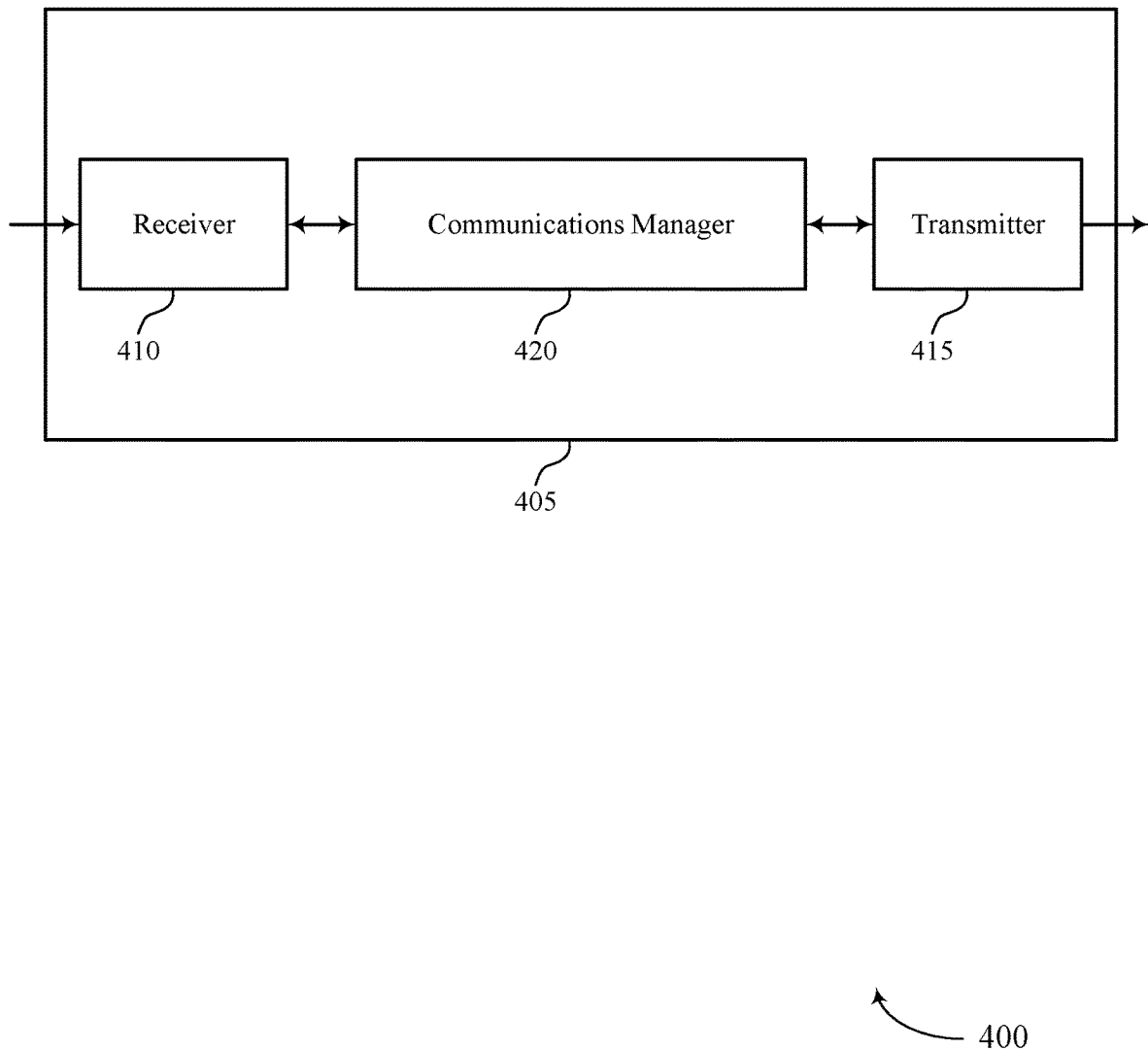
FIGS. 4 and 5 show block diagrams of devices that support power amplifier model estimation for digital post distortion in multi-antenna devices in accordance with aspects of the present disclosure.

FIG. 4 shows a block diagram 400 of a device 405 that supports power amplifier model estimation for digital post distortion in multi-antenna devices in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to power amplifier model estimation for digital post distortion in multi-antenna devices). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to power amplifier model estimation for digital post distortion in multi-antenna devices). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of power amplifier model estimation for digital post distortion in multi-antenna devices as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, an indication of a power amplifier model for each antenna group of a set of multiple antenna groups, each antenna group being associated with a respective set of transmitter antennas of the base station and a power amplifier response of each transmitter antenna. The communications manager 420 may be configured as or otherwise support a means for determining a power amplifier model for a transmitter antenna of the set of transmitter antennas based on the indication of the power amplifier model for an antenna group of the set of multiple antenna groups and the transmitter antenna being associated with the antenna group. The communications manager 420 may be configured as or otherwise support a means for communicating with the base station based on the power amplifier model for the transmitter antenna.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improvements in system efficiency such that system latency associated with indication of power amplifier models is reduced. Additionally, described techniques may result in reduced processing, reduced power consumption, more efficient utilization of communication resources.

Figure 5:
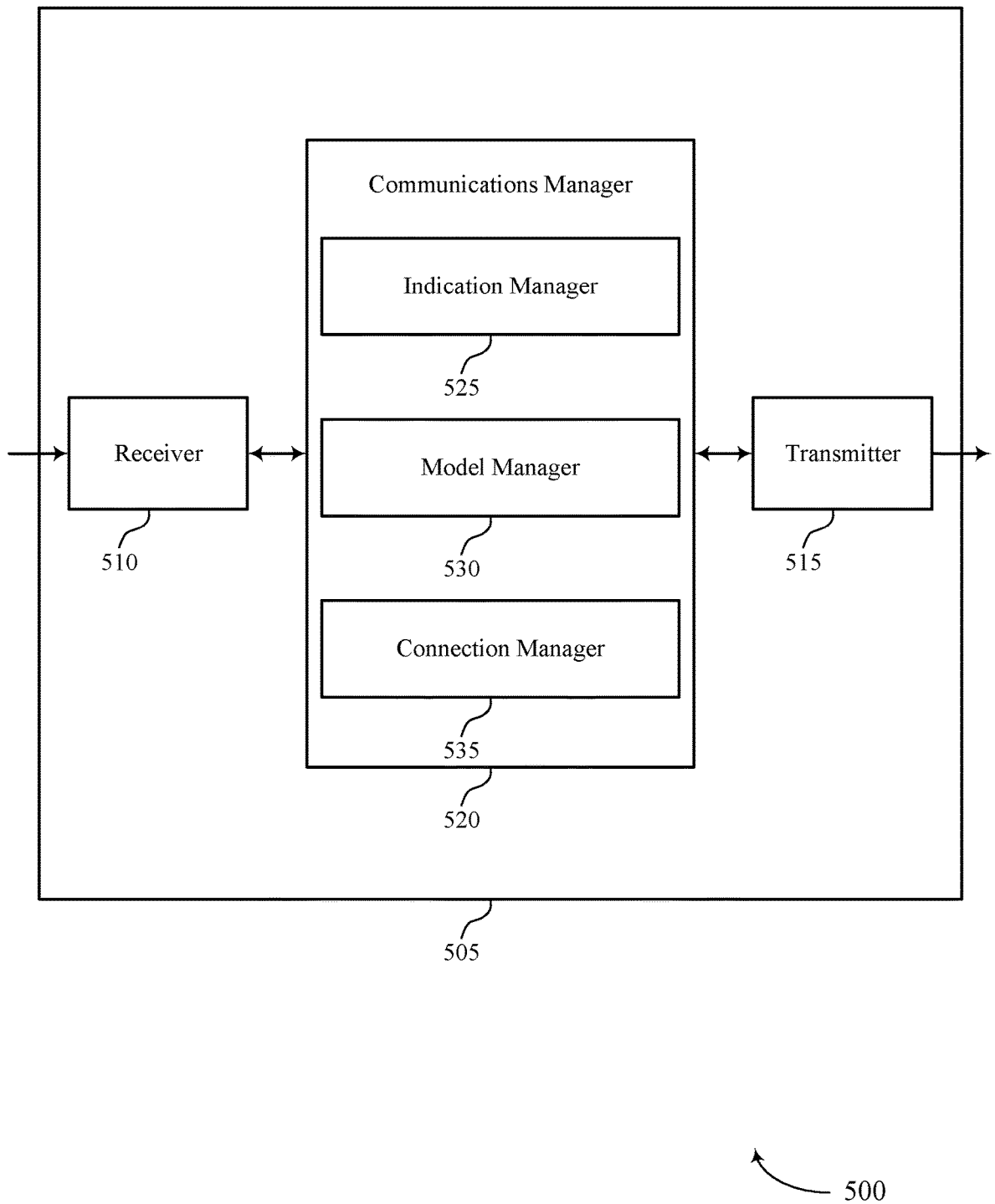

FIG. 5 shows a block diagram 500 of a device 505 that supports power amplifier model estimation for digital post distortion in multi-antenna devices in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power amplifier model estimation for digital post distortion in multi-antenna devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power amplifier model estimation for digital post distortion in multi-antenna devices). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of power amplifier model estimation for digital post distortion in multi-antenna devices as described herein. For example, the communications manager 520 may include an indication manager 525, a model manager 530, a connection manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The indication manager 525 may be configured as or otherwise support a means for receiving, from a base station, an indication of a power amplifier model for each antenna group of a set of multiple antenna groups, each antenna group being associated with a respective set of transmitter antennas of the base station and a power amplifier response of each transmitter antenna. The model manager 530 may be configured as or otherwise support a means for determining a power amplifier model for a transmitter antenna of the set of transmitter antennas based on the indication of the power amplifier model for an antenna group of the set of multiple antenna groups and the transmitter antenna being associated with the antenna group. The connection manager 535 may be configured as or otherwise support a means for communicating with the base station based on the power amplifier model for the transmitter antenna.

Figure 6:
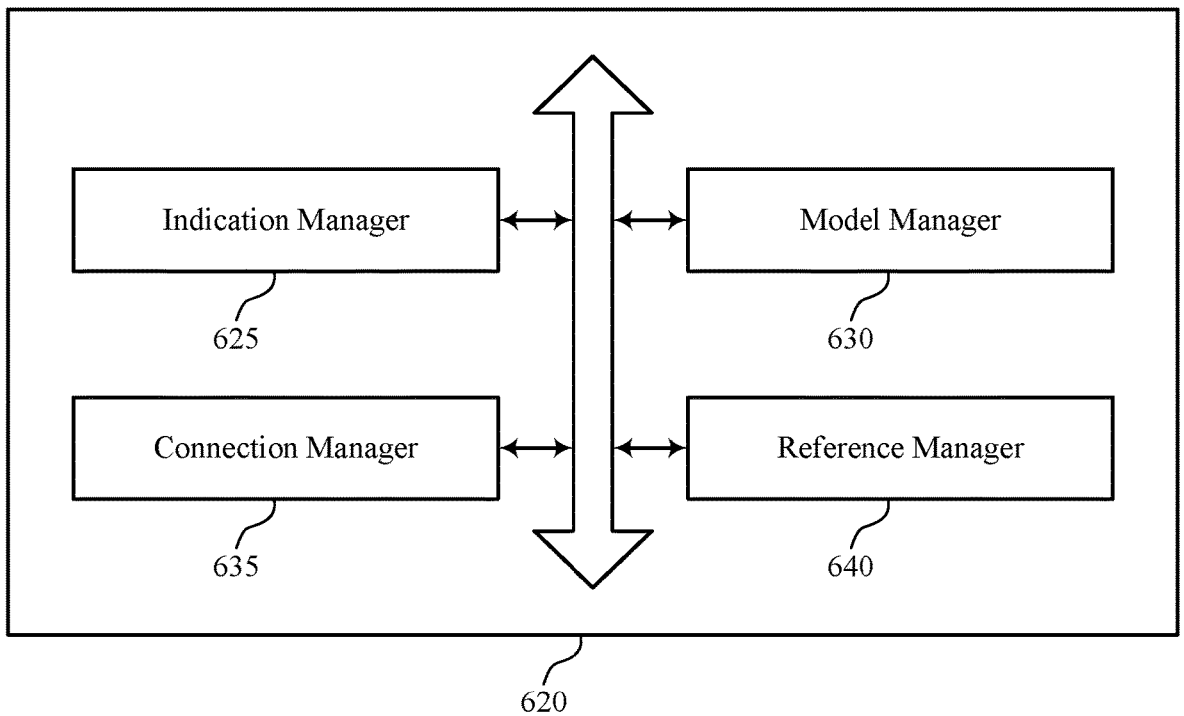
FIG. 6 shows a block diagram of a communications manager that supports power amplifier model estimation for digital post distortion in multi-antenna devices in accordance with aspects of the present disclosure.

FIG. 6 shows a block diagram 600 of a communications manager 620 that supports power amplifier model estimation for digital post distortion in multi-antenna devices in accordance with aspects of the present disclosure. The communications manager 620 may be an example of aspects of a communications manager 420, a communications manager 520, or both, as described herein. The communications manager 620, or various components thereof, may be an example of means for performing various aspects of power amplifier model estimation for digital post distortion in multi-antenna devices as described herein. For example, the communications manager 620 may include an indication manager 625, a model manager 630, a connection manager 635, a reference manager 640, or any combination thereof. Each of these components may communicate, directly or indirectly, with one another (e.g., via one or more buses).

The communications manager 620 may support wireless communication at a UE in accordance with examples as disclosed herein. The indication manager 625 may be configured as or otherwise support a means for receiving, from a base station, an indication of a power amplifier model for each antenna group of a set of multiple antenna groups, each antenna group being associated with a respective set of transmitter antennas of the base station and a power amplifier response of each transmitter antenna. The model manager 630 may be configured as or otherwise support a means for determining a power amplifier model for a transmitter antenna of the set of transmitter antennas based on the indication of the power amplifier model for an antenna group of the set of multiple antenna groups and the transmitter antenna being associated with the antenna group. The connection manager 635 may be configured as or otherwise support a means for communicating with the base station based on the power amplifier model for the transmitter antenna.

In some examples, to support receiving the indication of the power amplifier model for each antenna group, the reference manager 640 may be configured as or otherwise support a means for receiving a first reference signal for a first antenna group of the set of multiple antenna groups and a second reference signal for a second antenna group of the set of multiple antenna groups, where communicating with the base station is based on the receiving.

In some examples, the reference manager 640 may be configured as or otherwise support a means for determining a first power amplifier model for the first antenna group based on the first reference signal and a second power amplifier model for the second antenna group based on the second reference signal. In some examples, the reference manager 640 may be configured as or otherwise support a means for applying the first power amplifier model to each transmitter antenna mapped to the first antenna group and the second power amplifier model to each transmitter antenna mapped to the second antenna group, where communicating with the base station is based on the applying.

In some examples, the first reference signal, or the second reference signal, or both include a respective demodulation reference signal.

In some examples, to support receiving the indication of the power amplifier model for each antenna group, the indication manager 625 may be configured as or otherwise support a means for receiving, from the base station, each power amplifier model for each antenna group of the set of multiple antenna groups, where the indication of the power amplifier model is received in a radio resource control message, and where communicating with the base station is based on the receiving.

In some examples, the indication manager 625 may be configured as or otherwise support a means for determining that the indication of the power amplifier model indicates which transmitter antennas are associated with each antenna group of the set of multiple antenna groups and which of the power amplifier models to use for each antenna group, or indicates which of the power amplifier models to use with each antenna group of the set of multiple antenna groups for a given temperature, or indicates both, where communicating with the base station is based on the determining.

In some examples, the indication manager 625 may be configured as or otherwise support a means for determining that the indication of the power amplifier model indicates a link between a first power amplifier model of a first antenna group of the set of multiple antenna groups and a first set of one or more antenna rows of a precoding matrix, and indicates a link between a second power amplifier model of a second antenna group of the set of multiple antenna groups and a second set of one or more antenna rows of the precoding matrix, where communicating with the base station is based on the determining.

In some examples, the indication manager 625 may be configured as or otherwise support a means for determining that the indication of the power amplifier model indicates, from a set of one or more linking patterns preconfigured on the UE, a preconfigured linking pattern that links a first power amplifier model of a first antenna group of the set of multiple antenna groups with a first set of one or more antenna rows of a precoding matrix, and links a second power amplifier model of a second antenna group of the set of multiple antenna groups with a second set of one or more antenna rows of the precoding matrix, where communicating with the base station is based on the determining.

In some examples, the indication manager 625 may be configured as or otherwise support a means for determining that the indication of the power amplifier model indicates a first list of kernels associated with a first power amplifier model of a first antenna group of the set of multiple antenna groups, and a second list of kernels associated with a second power amplifier model of a second antenna group of the set of multiple antenna groups, where communicating with the base station is based on the determining.

In some examples, the indication manager 625 may be configured as or otherwise support a means for determining that the indication of the power amplifier model indicates a matrix of basis functions respectively associated with the set of multiple antenna groups, where communicating with the base station is based on the determining.

In some examples, to support communicating with the base station, the connection manager 635 may be configured as or otherwise support a means for implementing a digital post distortion model based on the power amplifier model of the transmitter antenna. In some examples, to support communicating with the base station, the connection manager 635 may be configured as or otherwise support a means for performing digital post distortion processing on signals received from the base station based on the digital post distortion model.

Figure 7:
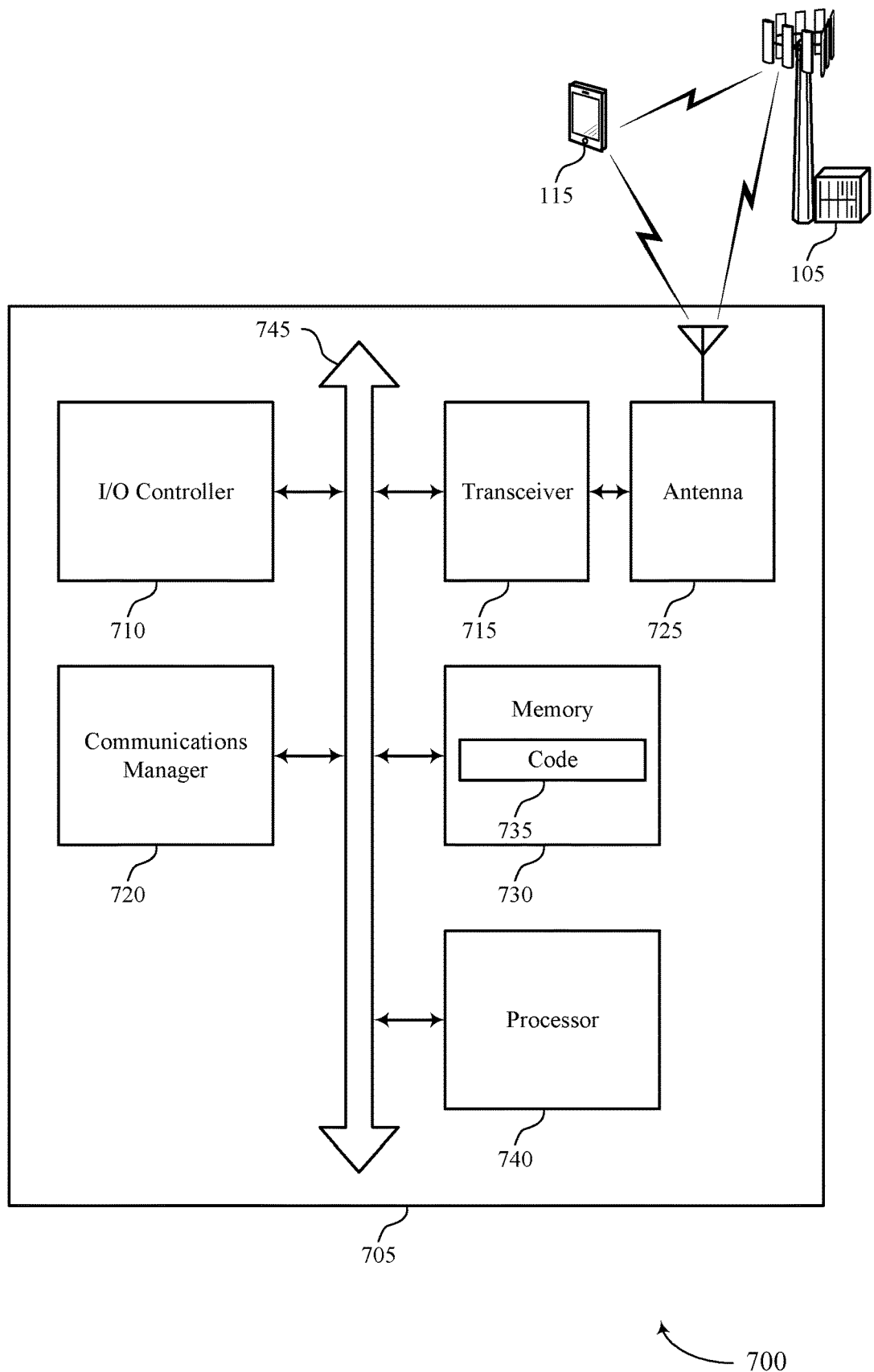
FIG. 7 shows a diagram of a system including a device that supports power amplifier model estimation for digital post distortion in multi-antenna devices in accordance with aspects of the present disclosure.

FIG. 7 shows a diagram of a system 700 including a device 705 that supports power amplifier model estimation for digital post distortion in multi-antenna devices in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting power amplifier model estimation for digital post distortion in multi-antenna devices). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, an indication of a power amplifier model for each antenna group of a set of multiple antenna groups, each antenna group being associated with a respective set of transmitter antennas of the base station and a power amplifier response of each transmitter antenna. The communications manager 720 may be configured as or otherwise support a means for determining a power amplifier model for a transmitter antenna of the set of transmitter antennas based on the indication of the power amplifier model for an antenna group of the set of multiple antenna groups and the transmitter antenna being associated with the antenna group. The communications manager 720 may be configured as or otherwise support a means for communicating with the base station based on the power amplifier model for the transmitter antenna.

By including or configuring the communications manager 720 in accordance with examples as described herein, the device 705 may support techniques for improvements in system efficiency such that system latency associated with indication of power amplifier models is reduced. Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of power amplifier model estimation for digital post distortion in multi-antenna devices as described herein, or the processor 740 and the memory 730 may be otherwise configured to perform or support such operations.

Figure 8:
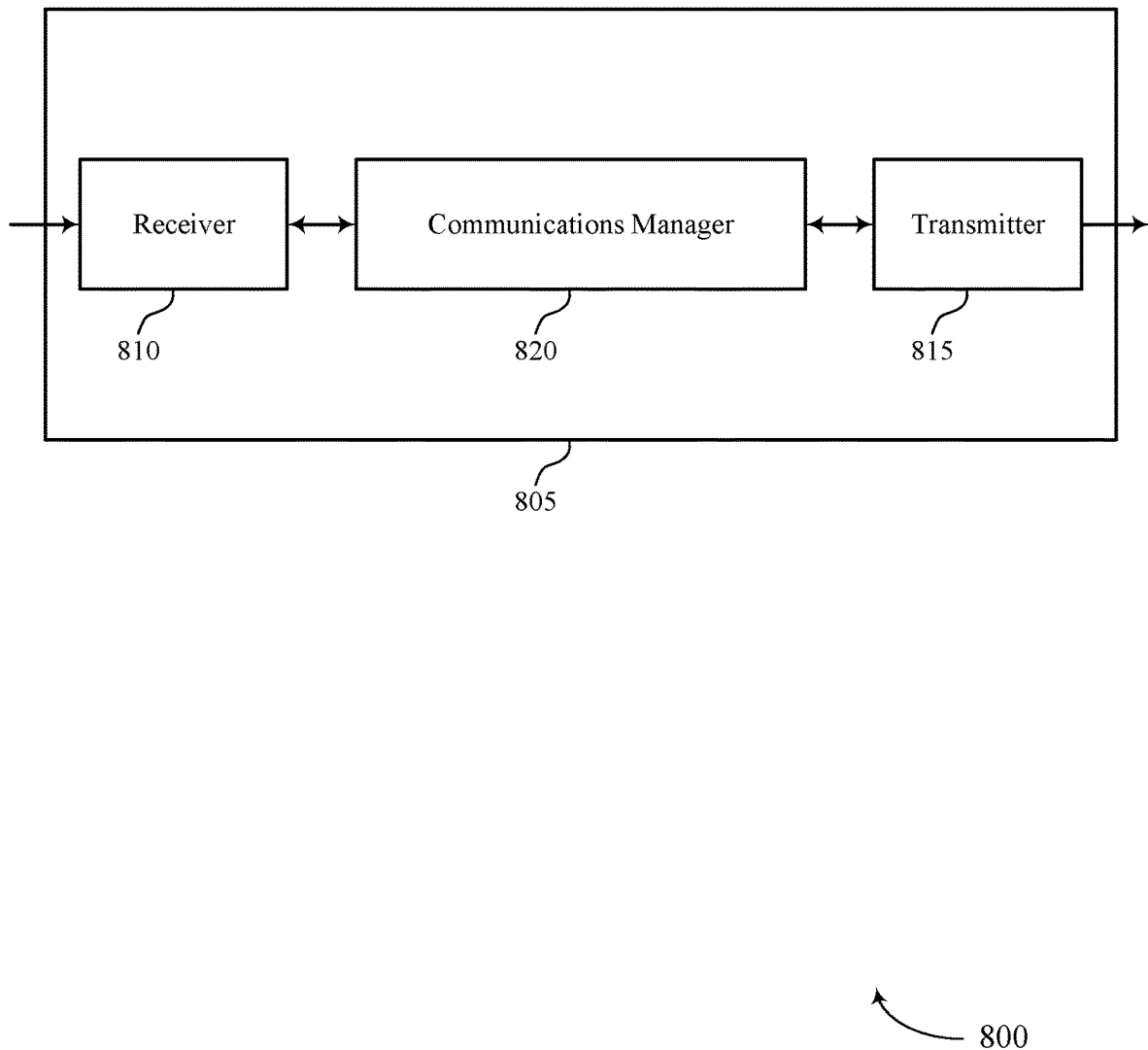
FIGS. 8 and 9 show block diagrams of devices that support power amplifier model estimation for digital post distortion in multi-antenna devices in accordance with aspects of the present disclosure.

FIG. 8 shows a block diagram 800 of a device 805 that supports power amplifier model estimation for digital post distortion in multi-antenna devices in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power amplifier model estimation for digital post distortion in multi-antenna devices). Information may be passed on to other components of the device 805. The receiver 810 may utilize a single antenna or a set of multiple antennas.

The transmitter 815 may provide a means for transmitting signals generated by other components of the device 805.

For example, the transmitter 815 may transmit information such as packets, user data, control information, or any combination thereof associated with various information channels (e.g., control channels, data channels, information channels related to power amplifier model estimation for digital post distortion in multi-antenna devices). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of power amplifier model estimation for digital post distortion in multi-antenna devices as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for mapping each transmitter antenna of the base station to one of a set of multiple antenna groups based on a power amplifier response of each transmitter antenna. The communications manager 820 may be configured as or otherwise support a means for determining a power amplifier model for each antenna group of the set of multiple antenna groups based on the power amplifier response of each transmitter antenna. The communications manager 820 may be configured as or otherwise support a means for transmitting an indication of the power amplifier model for each antenna group of the set of multiple antenna groups to a UE. The communications manager 820 may be configured as or otherwise support a means for communicating with the UE based on at least one of the power amplifier models.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improvements in system efficiency such that system latency associated with indication of power amplifier models is reduced. Additionally, described techniques may result in reduced processing, reduced power consumption, more efficient utilization of communication resources.

Figure 9:
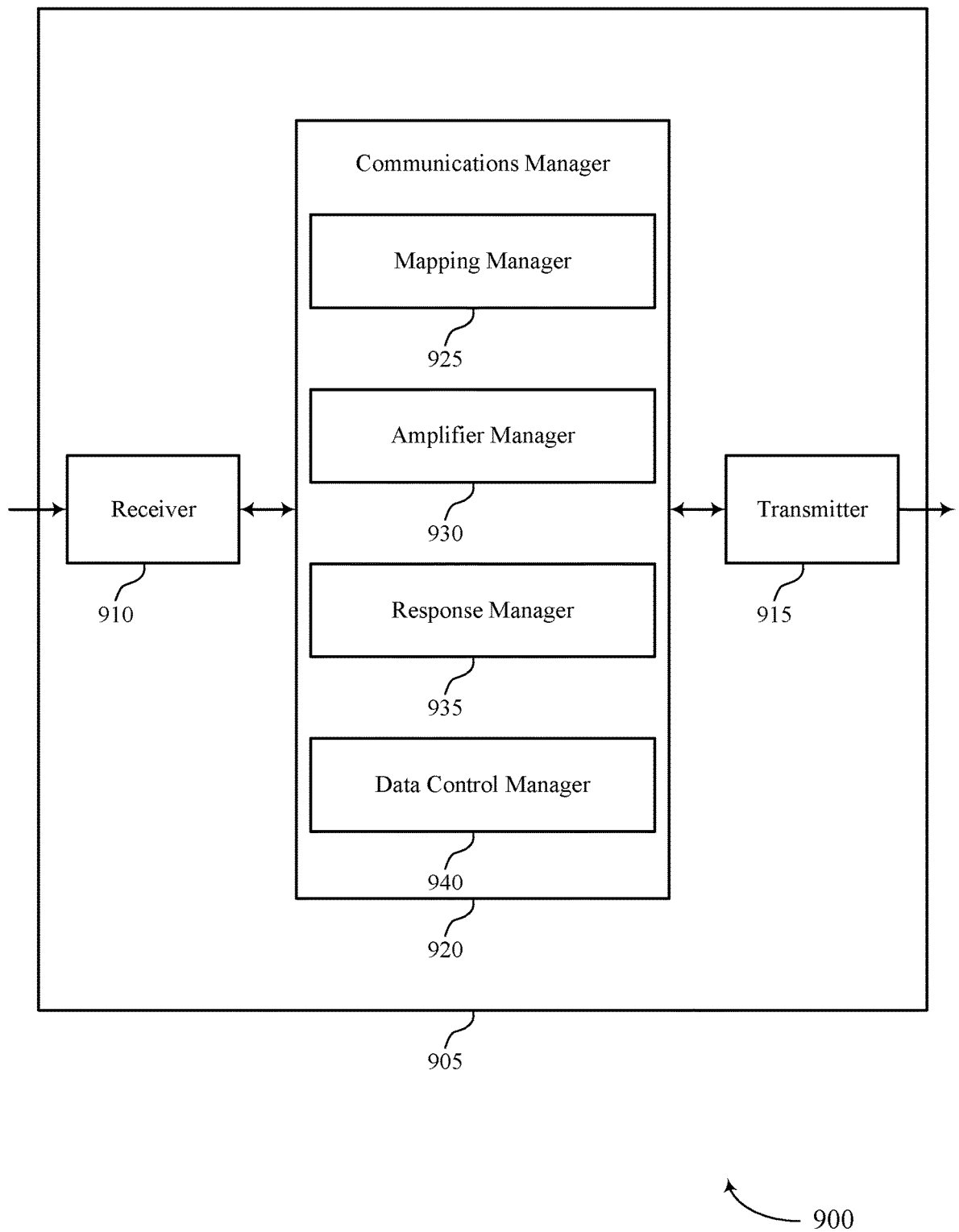

FIG. 9 shows a block diagram 900 of a device 905 that supports power amplifier model estimation for digital post distortion in multi-antenna devices in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to power amplifier model estimation for digital post distortion in multi-antenna devices). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to power amplifier model estimation for digital post distortion in multi-antenna devices). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of power amplifier model estimation for digital post distortion in multi-antenna devices as described herein. For example, the communications manager 920 may include a mapping manager 925, an amplifier manager 930, a response manager 935, a data control manager 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The mapping manager 925 may be configured as or otherwise support a means for mapping each transmitter antenna of the base station to one of a set of multiple antenna groups based on a power amplifier response of each transmitter antenna. The amplifier manager 930 may be configured as or otherwise support a means for determining a power amplifier model for each antenna group of the set of multiple antenna groups based on the power amplifier response of each transmitter antenna. The response manager 935 may be configured as or otherwise support a means for transmitting an indication of the power amplifier model for each antenna group of the set of multiple antenna groups to a UE. The data control manager 940 may be configured as or otherwise support a means for communicating with the UE based on at least one of the power amplifier models.

Figure 10:
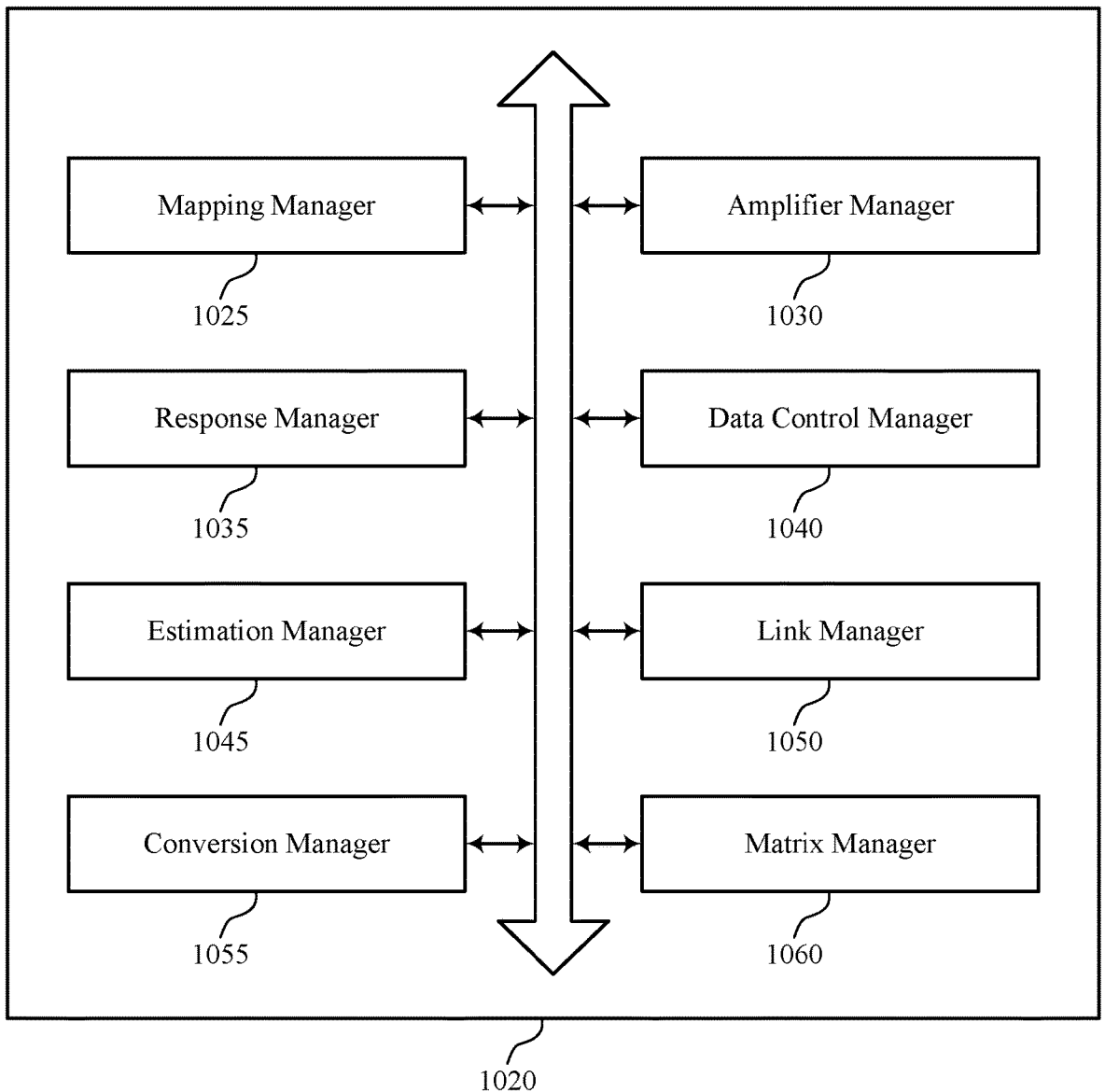
FIG. 10 shows a block diagram of a communications manager that supports power amplifier model estimation for digital post distortion in multi-antenna devices in accordance with aspects of the present disclosure.

FIG. 10 shows a block diagram 1000 of a communications manager 1020 that supports power amplifier model estimation for digital post distortion in multi-antenna devices in accordance with aspects of the present disclosure. The communications manager 1020 may be an example of aspects of a communications manager 820, a communications manager 920, or both, as described herein. The communications manager 1020, or various components thereof, may be an example of means for performing various aspects of power amplifier model estimation for digital post distortion in multi-antenna devices as described herein. For example, the communications manager 1020 may include a mapping manager 1025, an amplifier manager 1030, a response manager 1035, a data control manager 1040, an estimation manager 1045, a link manager 1050, a conversion manager 1055, a matrix manager 1060, or any combination thereof. Each of these components may communicate, directly or indirectly, with one another (e.g., via one or more buses).

The communications manager 1020 may support wireless communication at a base station in accordance with examples as disclosed herein. The mapping manager 1025 may be configured as or otherwise support a means for mapping each transmitter antenna of the base station to one of a set of multiple antenna groups based on a power amplifier response of each transmitter antenna. The amplifier manager 1030 may be configured as or otherwise support a means for determining a power amplifier model for each antenna group of the set of multiple antenna groups based on the power amplifier response of each transmitter antenna. The response manager 1035 may be configured as or otherwise support a means for transmitting an indication of the power amplifier model for each antenna group of the set of multiple antenna groups to a UE. The data control manager 1040 may be configured as or otherwise support a means for communicating with the UE based on at least one of the power amplifier models.

In some examples, the estimation manager 1045 may be configured as or otherwise support a means for transmitting a first reference signal for a first antenna group of the set of multiple antenna groups and a second reference signal for a second antenna group of the set of multiple antenna groups, where communicating with the UE is based on the transmitting.

In some examples, the estimation manager 1045 may be configured as or otherwise support a means for frequency domain multiplexing a first antenna port of the first reference signal with a second antenna port of the second reference signal, where communicating with the UE is based on the frequency domain multiplexing. In some examples, the first reference signal, or the second reference signal, or both include a respective demodulation reference signal.

In some examples, the estimation manager 1045 may be configured as or otherwise support a means for using each transmitter antenna of a first group of antennas of the set of multiple antenna groups to form a first beam associated with the first reference signal. In some examples, the estimation manager 1045 may be configured as or otherwise support a means for using each transmitter antenna of a second group of antennas of the set of multiple antenna groups to form a second beam associated with the second reference signal, where communicating with the UE is based on the forming the first beam and the forming the second beam.

In some examples, the response manager 1035 may be configured as or otherwise support a means for transmitting, to the UE, each power amplifier model for each antenna group of the set of multiple antenna groups, where the indication of the power amplifier model is transmitted in a radio resource control message, and where communicating with the UE is based on the transmitting.

In some examples, the response manager 1035 may be configured as or otherwise support a means for indicating in the indication of the power amplifier model which transmitter antennas are associated with each antenna group of the set of multiple antenna groups and which of the power amplifier models to use for each antenna group, or which of the power amplifier models to use with each antenna group of the set of multiple antenna groups for a given temperature, or both.

In some examples, the link manager 1050 may be configured as or otherwise support a means for indicating in the indication of the power amplifier model a link between a first power amplifier model of a first antenna group of the set of multiple antenna groups and a first set of one or more antenna rows of a precoding matrix and a link between a second power amplifier model of a second antenna group of the set of multiple antenna groups and a second set of one or more antenna rows of the precoding matrix.

In some examples, the link manager 1050 may be configured as or otherwise support a means for indicating in the indication of the power amplifier model a preconfigured linking pattern, from a set of one or more linking patterns preconfigured on the UE, that links a first power amplifier model of a first antenna group of the set of multiple antenna groups with a first set of one or more antenna rows of a precoding matrix, and links a second power amplifier model of a second antenna group of the set of multiple antenna groups with a second set of one or more antenna rows of the precoding matrix.

In some examples, to support determining the power amplifier model of each antenna group, the conversion manager 1055 may be configured as or otherwise support a means for converting a first power amplifier model of a first antenna group of the set of multiple antenna groups into a first list of kernels. In some examples, to support determining the power amplifier model of each antenna group, the conversion manager 1055 may be configured as or otherwise support a means for converting a second power amplifier model of a second antenna group of the set of multiple antenna groups into a second list of kernels.

In some examples, to support transmitting the indication of the power amplifier model of each antenna group, the conversion manager 1055 may be configured as or otherwise support a means for transmitting at least the first list of kernels and the second list of kernels to the UE.

In some examples, to support determining the power amplifier model of each antenna group, the matrix manager 1060 may be configured as or otherwise support a means for projecting coefficients of the power amplifier model of each transmitter antenna onto a reduced set of basis functions. In some examples, to support determining the power amplifier model of each antenna group, the matrix manager 1060 may be configured as or otherwise support a means for determining a matrix of basis functions based on the projecting.

In some examples, to support transmitting the indication of the power amplifier model of each antenna group, the matrix manager 1060 may be configured as or otherwise support a means for transmitting the matrix of basis functions to the UE.

Figure 11:
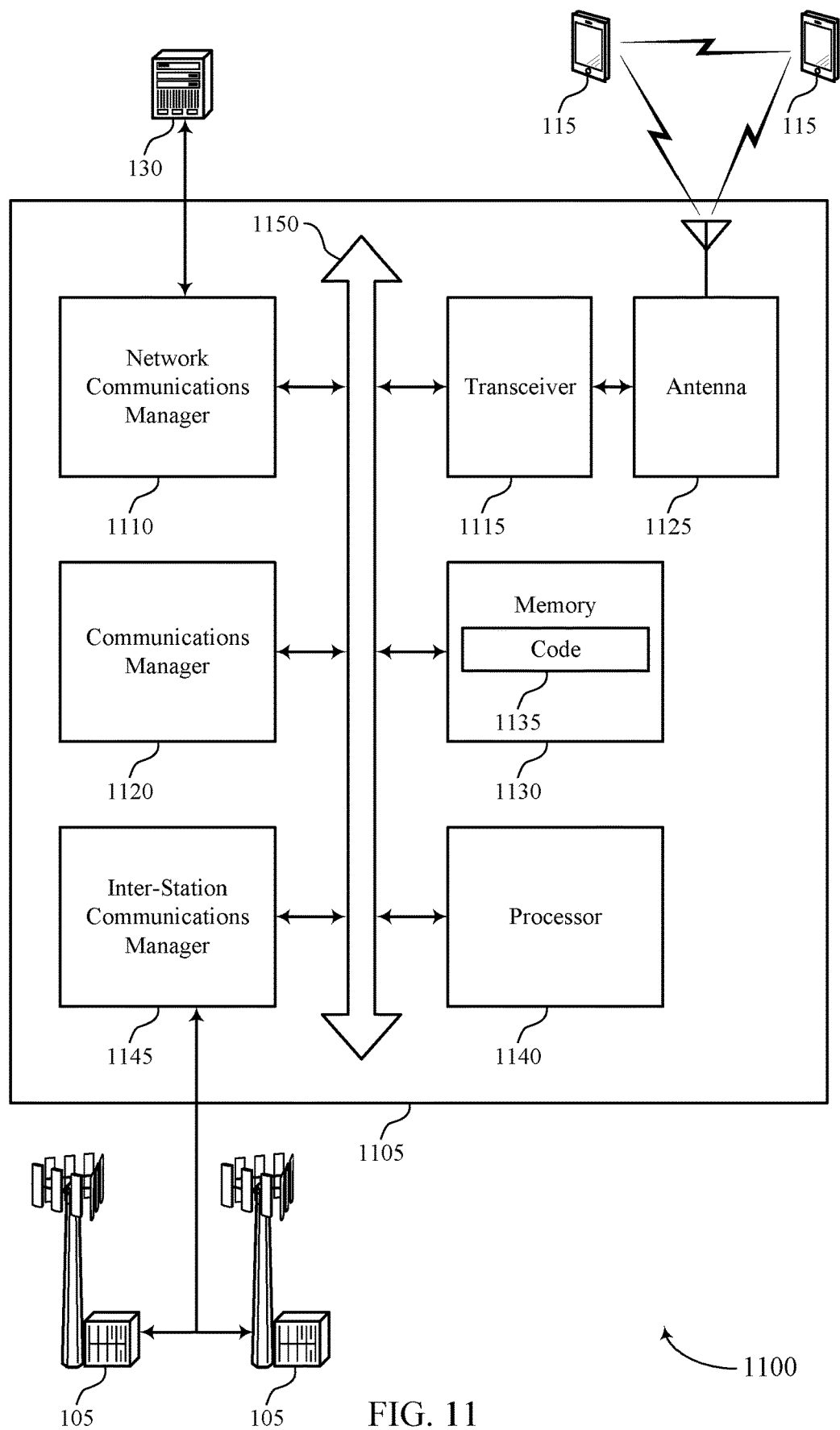
FIG. 11 shows a diagram of a system including a device that supports power amplifier model estimation for digital post distortion in multi-antenna devices in accordance with aspects of the present disclosure.

FIG. 11 shows a diagram of a system 1100 including a device 1105 that supports power amplifier model estimation for digital post distortion in multi-antenna devices in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting power amplifier model estimation for digital post distortion in multi-antenna devices). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for mapping each transmitter antenna of the base station to one of a set of multiple antenna groups based on a power amplifier response of each transmitter antenna. The communications manager 1120 may be configured as or otherwise support a means for determining a power amplifier model for each antenna group of the set of multiple antenna groups based on the power amplifier response of each transmitter antenna. The communications manager 1120 may be configured as or otherwise support a means for transmitting an indication of the power amplifier model for each antenna group of the set of multiple antenna groups to a UE. The communications manager 1120 may be configured as or otherwise support a means for communicating with the UE based on at least one of the power amplifier models.

By including or configuring the communications manager 1120 in accordance with examples as described herein, the device 1105 may support techniques for improvements in system efficiency such that system latency associated with indication of power amplifier models is reduced. Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of power amplifier model estimation for digital post distortion in multi-antenna devices as described herein, or the processor 1140 and the memory 1130 may be otherwise configured to perform or support such operations.

Figure 12:
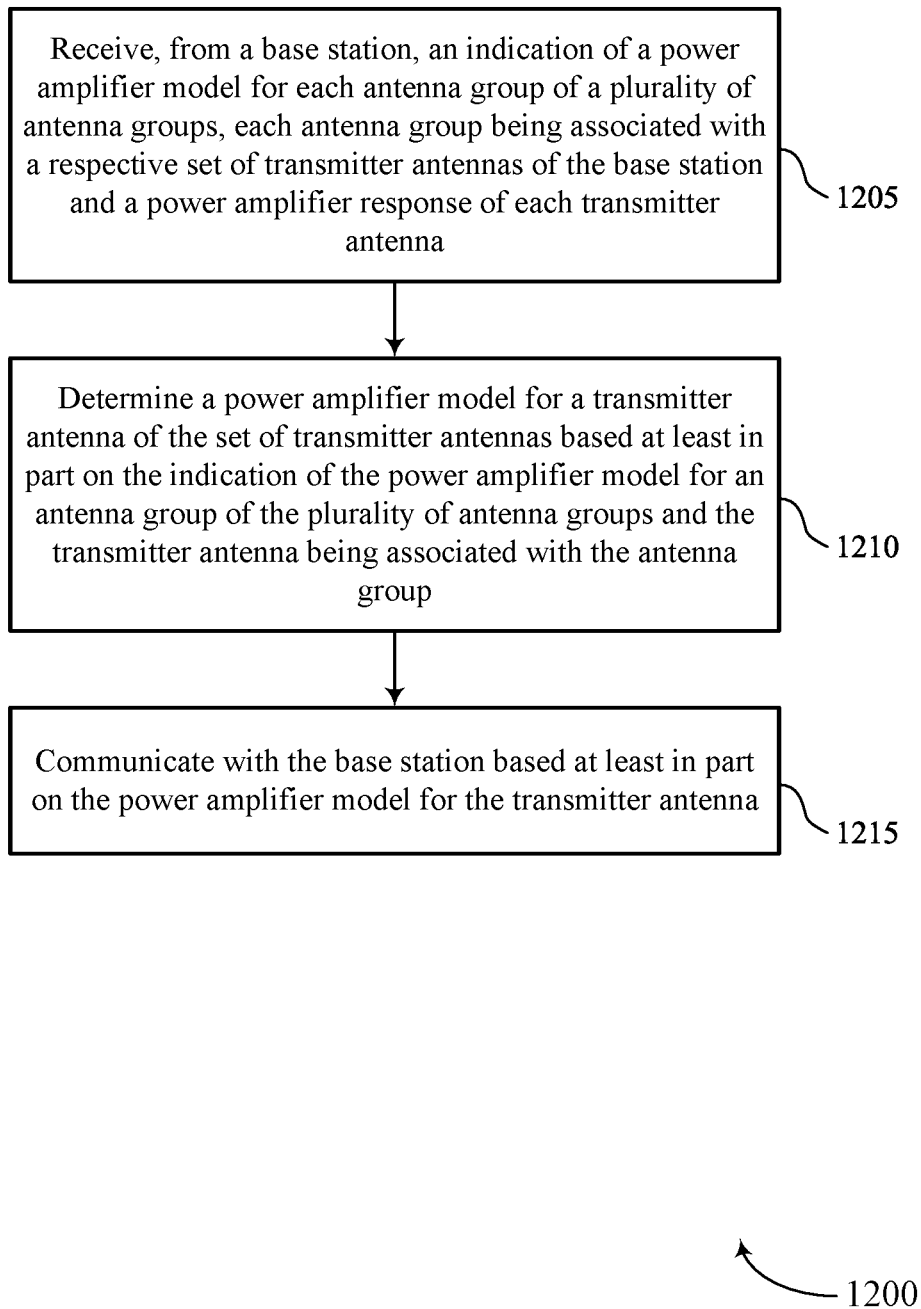
FIGS. 12 through 15 show flowcharts illustrating methods that support power amplifier model estimation for digital post distortion in multi-antenna devices in accordance with aspects of the present disclosure.

FIG. 12 shows a flowchart illustrating a method 1200 that supports power amplifier model estimation for digital post distortion in multi-antenna devices in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a power amplifier model for each antenna group of a set of multiple antenna groups, each antenna group being associated with a respective set of transmitter antennas of the base station and a power amplifier response of each transmitter antenna. The operations of 1205 may be performed in accordance with examples as disclosed herein. In some examples, aspects of the operations of 1205 may be performed by an indication manager 625 as described with reference to FIG. 6.

At 1210, the method may include determining a power amplifier model for a transmitter antenna of the set of transmitter antennas based on the indication of the power amplifier model for an antenna group of the set of multiple antenna groups and the transmitter antenna being associated with the antenna group. The operations of 1210 may be performed in accordance with examples as disclosed herein. In some examples, aspects of the operations of 1210 may be performed by a model manager 630 as described with reference to FIG. 6.

At 1215, the method may include communicating with the base station based on the power amplifier model for the transmitter antenna. The operations of 1215 may be performed in accordance with examples as disclosed herein. In some examples, aspects of the operations of 1215 may be performed by a connection manager 635 as described with reference to FIG. 6.

Figure 13:
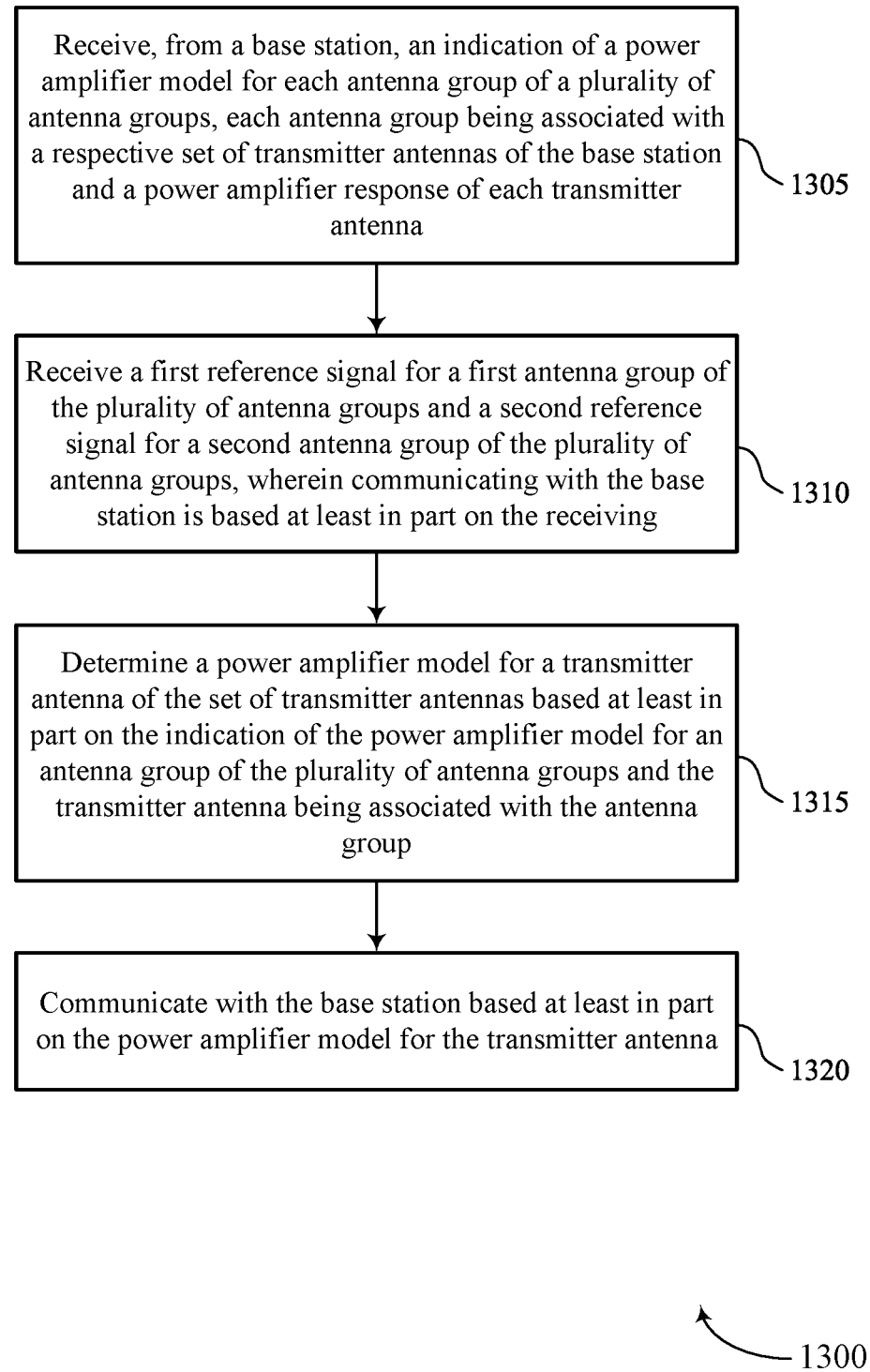

FIG. 13 shows a flowchart illustrating a method 1300 that supports power amplifier model estimation for digital post distortion in multi-antenna devices in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a power amplifier model for each antenna group of a set of multiple antenna groups, each antenna group being associated with a respective set of transmitter antennas of the base station and a power amplifier response of each transmitter antenna. The operations of 1305 may be performed in accordance with examples as disclosed herein. In some examples, aspects of the operations of 1305 may be performed by an indication manager 625 as described with reference to FIG. 6.

At 1310, the method may include receiving a first reference signal for a first antenna group of the set of multiple antenna groups and a second reference signal for a second antenna group of the set of multiple antenna groups, where communicating with the base station is based on the receiving of the first reference signal and the second reference signal. In some cases, the indication of the power amplifier model for each antenna group of the set of multiple antenna groups may include the first reference signal and the second reference signal. The operations of 1310 may be performed in accordance with examples as disclosed herein. In some examples, aspects of the operations of 1310 may be performed by a reference manager 640 as described with reference to FIG. 6.

At 1315, the method may include determining a power amplifier model for a transmitter antenna of the set of transmitter antennas based on the indication of the power amplifier model for an antenna group of the set of multiple antenna groups and the transmitter antenna being associated with the antenna group. The operations of 1315 may be performed in accordance with examples as disclosed herein. In some examples, aspects of the operations of 1315 may be performed by a model manager 630 as described with reference to FIG. 6.

At 1320, the method may include communicating with the base station based on the power amplifier model for the transmitter antenna. The operations of 1320 may be performed in accordance with examples as disclosed herein. In some examples, aspects of the operations of 1320 may be performed by a connection manager 635 as described with reference to FIG. 6.

Figure 14:
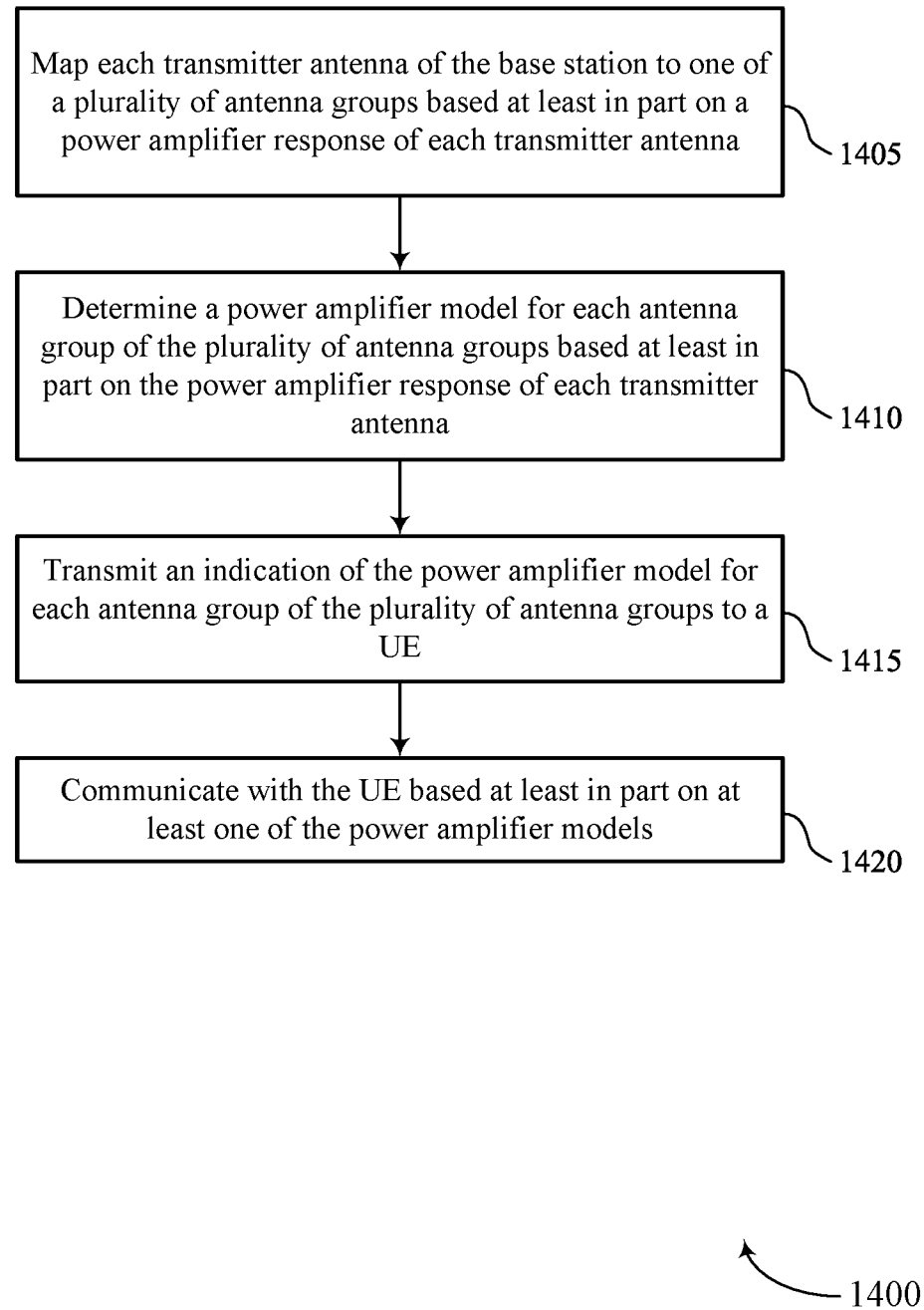

FIG. 14 shows a flowchart illustrating a method 1400 that supports power amplifier model estimation for digital post distortion in multi-antenna devices in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include mapping each transmitter antenna of the base station to one of a set of multiple antenna groups based on a power amplifier response of each transmitter antenna. The operations of 1405 may be performed in accordance with examples as disclosed herein. In some examples, aspects of the operations of 1405 may be performed by a mapping manager 1025 as described with reference to FIG. 10.

At 1410, the method may include determining a power amplifier model for each antenna group of the set of multiple antenna groups based on the power amplifier response of each transmitter antenna. The operations of 1410 may be performed in accordance with examples as disclosed herein.

In some examples, aspects of the operations of 1410 may be performed by an amplifier manager 1030 as described with reference to FIG. 10.

At 1415, the method may include transmitting an indication of the power amplifier model for each antenna group of the set of multiple antenna groups to a UE. The operations of 1415 may be performed in accordance with examples as disclosed herein. In some examples, aspects of the operations of 1415 may be performed by a response manager 1035 as described with reference to FIG. 10.

At 1420, the method may include communicating with the UE based on at least one of the power amplifier models. The operations of 1420 may be performed in accordance with examples as disclosed herein. In some examples, aspects of the operations of 1420 may be performed by a data control manager 1040 as described with reference to FIG. 10.

Figure 15:
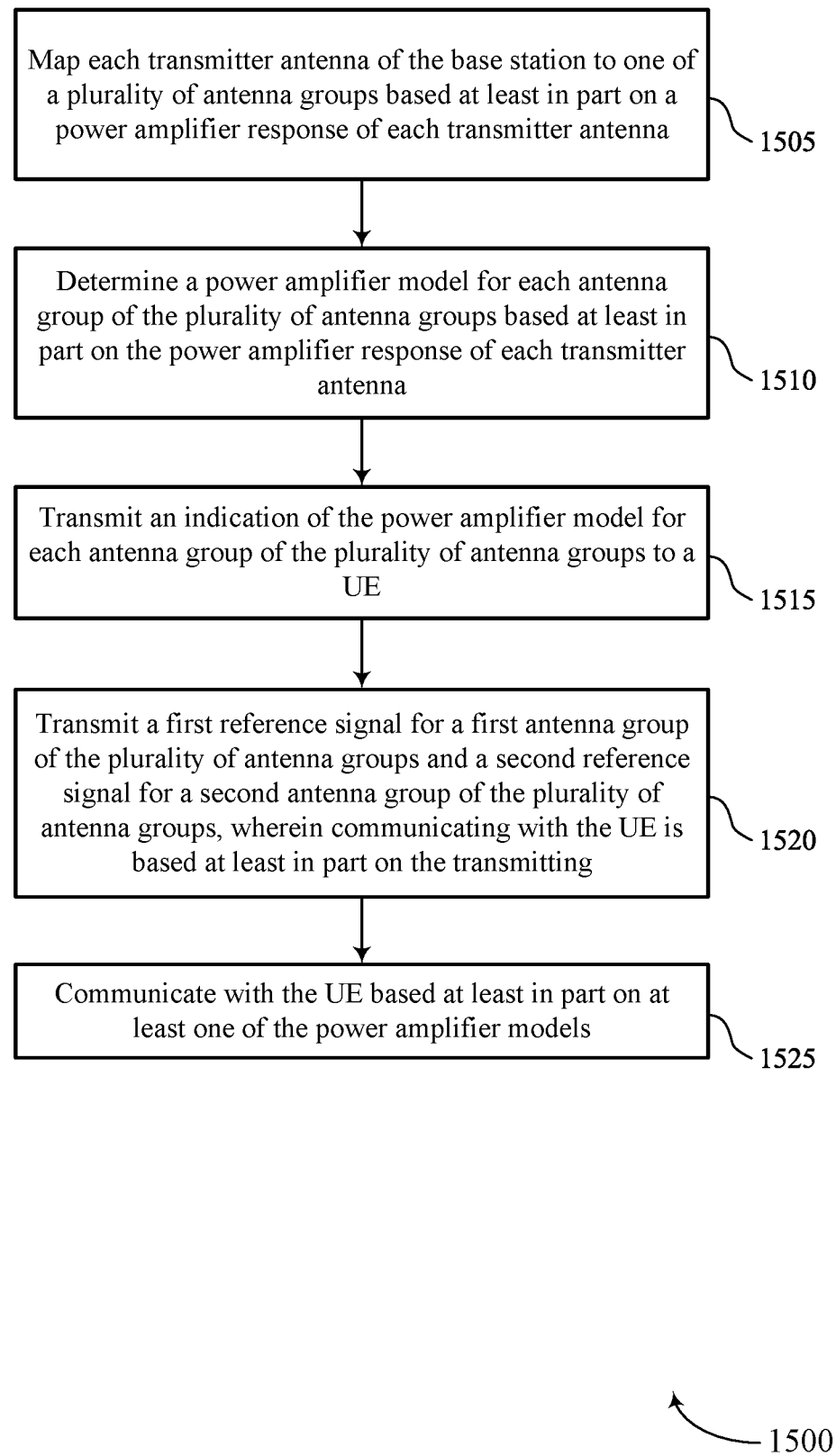

FIG. 15 shows a flowchart illustrating a method 1500 that supports power amplifier model estimation for digital post distortion in multi-antenna devices in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include mapping each transmitter antenna of the base station to one of a set of multiple antenna groups based on a power amplifier response of each transmitter antenna. The operations of 1505 may be performed in accordance with examples as disclosed herein. In some examples, aspects of the operations of 1505 may be performed by a mapping manager 1025 as described with reference to FIG. 10.

At 1510, the method may include determining a power amplifier model for each antenna group of the set of multiple antenna groups based on the power amplifier response of each transmitter antenna. The operations of 1510 may be performed in accordance with examples as disclosed herein. In some examples, aspects of the operations of 1510 may be performed by an amplifier manager 1030 as described with reference to FIG. 10.

At 1515, the method may include transmitting an indication of the power amplifier model for each antenna group of the set of multiple antenna groups to a UE. The operations of 1515 may be performed in accordance with examples as disclosed herein. In some examples, aspects of the operations of 1515 may be performed by a response manager 1035 as described with reference to FIG. 10.

At 1520, the method may include transmitting a first reference signal for a first antenna group of the set of multiple antenna groups and a second reference signal for a second antenna group of the set of multiple antenna groups, where communicating with the UE is based on the transmitting of the first reference signal and the second reference signal. In some cases, the indication of the power amplifier model for each antenna group of the set of multiple antenna groups may include the first reference signal and the second reference signal. The operations of 1520 may be performed in accordance with examples as disclosed herein. In some examples, aspects of the operations of 1520 may be performed by an estimation manager 1045 as described with reference to FIG. 10.

At 1525, the method may include communicating with the UE based on at least one of the power amplifier models. The operations of 1525 may be performed in accordance with examples as disclosed herein. In some examples, aspects of the operations of 1525 may be performed by a data control manager 1040 as described with reference to FIG. 10.

The following provides an overview of aspects of the present disclosure:

Aspect 1: A method for wireless communication at a UE, comprising: receiving, from a base station, an indication of a power amplifier model for each antenna group of a plurality of antenna groups, each antenna group being associated with a respective set of transmitter antennas of the base station and a power amplifier response of each transmitter antenna; determining a power amplifier model for a transmitter antenna of the set of transmitter antennas based at least in part on the indication of the power amplifier model for an antenna group of the plurality of antenna groups and the transmitter antenna being associated with the antenna group; and communicating with the base station based at least in part on the power amplifier model for the transmitter antenna.

Aspect 2: The method of aspect 1, wherein receiving the indication of the power amplifier model for each antenna group comprises: receiving a first reference signal for a first antenna group of the plurality of antenna groups and a second reference signal for a second antenna group of the plurality of antenna groups, wherein communicating with the base station is based at least in part on the receiving.

Aspect 3: The method of aspect 2, further comprising: determining a first power amplifier model for the first antenna group based at least in part on the first reference signal and a second power amplifier model for the second antenna group based at least in part on the second reference signal; and applying the first power amplifier model to each transmitter antenna mapped to the first antenna group and the second power amplifier model to each transmitter antenna mapped to the second antenna group, wherein communicating with the base station is based at least in part on the applying.

Aspect 4: The method of any of aspects 2 through 3, wherein the first reference signal, or the second reference signal, or both comprise a respective demodulation reference signal.

Aspect 5: The method of any of aspects 1 through 4, wherein receiving the indication of the power amplifier model for each antenna group comprises: receiving, from the base station, each power amplifier model for each antenna group of the plurality of antenna groups, wherein the indication of the power amplifier model is received in a radio resource control message, and wherein communicating with the base station is based at least in part on the receiving.

Aspect 6: The method of aspect 5, further comprising: determining that the indication of the power amplifier model indicates which transmitter antennas are associated with each antenna group of the plurality of antenna groups and which of the power amplifier models to use for each antenna group, or indicates which of the power amplifier models to use with each antenna group of the plurality of antenna groups for a given temperature, or indicates both, wherein communicating with the base station is based at least in part on the determining.

Aspect 7: The method of any of aspects 1 through 6, further comprising: determining that the indication of the power amplifier model indicates a link between a first power amplifier model of a first antenna group of the plurality of antenna groups and a first set of one or more antenna rows of a precoding matrix, and indicates a link between a second power amplifier model of a second antenna group of the plurality of antenna groups and a second set of one or more antenna rows of the precoding matrix, wherein communicating with the base station is based at least in part on the determining.

Aspect 8: The method of any of aspects 1 through 7, further comprising: determining that the indication of the power amplifier model indicates, from a set of one or more linking patterns preconfigured on the UE, a preconfigured linking pattern that links a first power amplifier model of a first antenna group of the plurality of antenna groups with a first set of one or more antenna rows of a precoding matrix, and links a second power amplifier model of a second antenna group of the plurality of antenna groups with a second set of one or more antenna rows of the precoding matrix, wherein communicating with the base station is based at least in part on the determining.

Aspect 9: The method of any of aspects 1 through 8, further comprising: determining that the indication of the power amplifier model indicates a first list of kernels associated with a first power amplifier model of a first antenna group of the plurality of antenna groups, and a second list of kernels associated with a second power amplifier model of a second antenna group of the plurality of antenna groups, wherein communicating with the base station is based at least in part on the determining.

Aspect 10: The method of any of aspects 1 through 9, further comprising: determining that the indication of the power amplifier model indicates a matrix of basis functions respectively associated with the plurality of antenna groups, wherein communicating with the base station is based at least in part on the determining.

Aspect 11: The method of any of aspects 1 through 10, wherein communicating with the base station comprises: implementing a digital post distortion model based at least in part on the power amplifier model of the transmitter antenna; and performing digital post distortion processing on signals received from the base station based at least in part on the digital post distortion model.

Aspect 12: A method for wireless communication at a base station, comprising: mapping each transmitter antenna of the base station to one of a plurality of antenna groups based at least in part on a power amplifier response of each transmitter antenna; determining a power amplifier model for each antenna group of the plurality of antenna groups based at least in part on the power amplifier response of each transmitter antenna; transmitting an indication of the power amplifier model for each antenna group of the plurality of antenna groups to a UE; and communicating with the UE based at least in part on at least one of the power amplifier models.

Aspect 13: The method of aspect 12, further comprising: transmitting a first reference signal for a first antenna group of the plurality of antenna groups and a second reference signal for a second antenna group of the plurality of antenna groups, wherein communicating with the UE is based at least in part on the transmitting.

Aspect 14: The method of aspect 13, further comprising: frequency domain multiplexing a first antenna port of the first reference signal with a second antenna port of the second reference signal, wherein communicating with the UE is based at least in part on the frequency domain multiplexing.

Aspect 15: The method of any of aspects 13 through 14, further comprising: using each transmitter antenna of a first group of antennas of the plurality of antenna groups to form a first beam associated with the first reference signal; and using each transmitter antenna of a second group of antennas of the plurality of antenna groups to form a second beam associated with the second reference signal, wherein communicating with the UE is based at least in part on the forming the first beam and the forming the second beam.

Aspect 16: The method of any of aspects 13 through 15, wherein the first reference signal, or the second reference signal, or both comprise a respective demodulation reference signal.

Aspect 17: The method of any of aspects 12 through 16, further comprising: transmitting, to the UE, each power amplifier model for each antenna group of the plurality of antenna groups, wherein the indication of the power amplifier model is transmitted in a radio resource control message, and wherein communicating with the UE is based at least in part on the transmitting.

Aspect 18: The method of aspect 17, further comprising: indicating in the indication of the power amplifier model which transmitter antennas are associated with each antenna group of the plurality of antenna groups and which of the power amplifier models to use for each antenna group, or which of the power amplifier models to use with each antenna group of the plurality of antenna groups for a given temperature, or both.

Aspect 19: The method of any of aspects 12 through 18, further comprising: indicating in the indication of the power amplifier model a link between a first power amplifier model of a first antenna group of the plurality of antenna groups and a first set of one or more antenna rows of a precoding matrix and a link between a second power amplifier model of a second antenna group of the plurality of antenna groups and a second set of one or more antenna rows of the precoding matrix.

Aspect 20: The method of any of aspects 12 through 19, further comprising: indicating in the indication of the power amplifier model a preconfigured linking pattern, from a set of one or more linking patterns preconfigured on the UE, that links a first power amplifier model of a first antenna group of the plurality of antenna groups with a first set of one or more antenna rows of a precoding matrix, and links a second power amplifier model of a second antenna group of the plurality of antenna groups with a second set of one or more antenna rows of the precoding matrix.

Aspect 21: The method of any of aspects 12 through 20, wherein determining the power amplifier model of each antenna group comprises: converting a first power amplifier model of a first antenna group of the plurality of antenna groups into a first list of kernels; and converting a second power amplifier model of a second antenna group of the plurality of antenna groups into a second list of kernels.

Aspect 22: The method of aspect 21, wherein transmitting the indication of the power amplifier model of each antenna group comprises: transmitting at least the first list of kernels and the second list of kernels to the UE.

Aspect 23: The method of any of aspects 12 through 22, wherein determining the power amplifier model of each antenna group comprises: projecting coefficients of the power amplifier model of each transmitter antenna onto a reduced set of basis functions; and determining a matrix of basis functions based at least in part on the projecting.

Aspect 24: The method of aspect 23, wherein transmitting the indication of the power amplifier model of each antenna group comprises: transmitting the matrix of basis functions to the UE.

Aspect 25: An apparatus for wireless communication at a UE, comprising a processor; memory coupled with the processor; and instructions stored in the memory and executable by the processor to cause the apparatus to perform a method of any of aspects 1 through 11.

Aspect 26: An apparatus for wireless communication at a UE, comprising at least one means for performing a method of any of aspects 1 through 11.

Aspect 27: A non-transitory computer-readable medium storing code for wireless communication at a UE, the code comprising instructions executable by a processor to perform a method of any of aspects 1 through 11.

Aspect 28: An apparatus for wireless communication at a base station, comprising a processor; memory coupled with the processor; and instructions stored in the memory and executable by the processor to cause the apparatus to perform a method of any of aspects 12 through 24.

Aspect 29: An apparatus for wireless communication at a base station, comprising at least one means for performing a method of any of aspects 12 through 24.

Aspect 30: A non-transitory computer-readable medium storing code for wireless communication at a base station, the code comprising instructions executable by a processor to perform a method of any of aspects 12 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network device, an indication of a power amplifier model for each antenna group of a plurality of antenna groups, each antenna group being associated with a respective set of transmitter antennas of the network device and a power amplifier response of each transmitter antenna;
   determining a power amplifier model for a transmitter antenna of the set of transmitter antennas based at least in part on the indication of the power amplifier model for an antenna group of the plurality of antenna groups and the transmitter antenna being associated with the antenna group; and
   communicating with the network device based at least in part on the power amplifier model for the transmitter antenna.

2. The method of claim 1, wherein receiving the indication of the power amplifier model for each antenna group comprises:
   receiving a first reference signal for a first antenna group of the plurality of antenna groups and a second reference signal for a second antenna group of the plurality of antenna groups, wherein communicating with the network device is based at least in part on the receiving.

3. The method of claim 2, further comprising:
   determining a first power amplifier model for the first antenna group based at least in part on the first reference signal and a second power amplifier model for the second antenna group based at least in part on the second reference signal; and
   applying the first power amplifier model to each transmitter antenna mapped to the first antenna group and the second power amplifier model to each transmitter antenna mapped to the second antenna group, wherein communicating with the network device is based at least in part on the applying.

4. The method of claim 2, wherein the first reference signal, or the second reference signal, or both comprise a respective demodulation reference signal.

5. The method of claim 1, wherein receiving the indication of the power amplifier model for each antenna group comprises:
   receiving, from the network device, each power amplifier model for each antenna group of the plurality of antenna groups, wherein the indication of the power amplifier model is received in a radio resource control message, and wherein communicating with the network device is based at least in part on the receiving.

6. The method of claim 5, further comprising:
   determining that the indication of the power amplifier model indicates which transmitter antennas are associated with each antenna group of the plurality of antenna groups and which of the power amplifier models to use for each antenna group, or indicates which of the power amplifier models to use with each antenna group of the plurality of antenna groups for a given temperature, or indicates both, wherein communicating with the network device is based at least in part on the determining.

7. The method of claim 1, further comprising:
   determining that the indication of the power amplifier model indicates a link between a first power amplifier model of a first antenna group of the plurality of antenna groups and a first set of one or more antenna rows of a precoding matrix, and indicates a link between a second power amplifier model of a second antenna group of the plurality of antenna groups and a second set of one or more antenna rows of the precoding matrix, wherein communicating with the network device is based at least in part on the determining.

8. The method of claim 1, further comprising:
   determining that the indication of the power amplifier model indicates, from a set of one or more linking patterns preconfigured on the UE, a preconfigured linking pattern that links a first power amplifier model of a first antenna group of the plurality of antenna groups with a first set of one or more antenna rows of a precoding matrix, and links a second power amplifier model of a second antenna group of the plurality of antenna groups with a second set of one or more antenna rows of the precoding matrix, wherein communicating with the network device is based at least in part on the determining.

9. The method of claim 1, further comprising:
   determining that the indication of the power amplifier model indicates a first list of kernels associated with a first power amplifier model of a first antenna group of the plurality of antenna groups, and a second list of kernels associated with a second power amplifier model of a second antenna group of the plurality of antenna groups, wherein communicating with the network device is based at least in part on the determining.

10. The method of claim 1, further comprising:
    determining that the indication of the power amplifier model indicates a matrix of basis functions respectively associated with the plurality of antenna groups, wherein communicating with the network device is based at least in part on the determining.

11. The method of claim 1, wherein communicating with the network device comprises:
    implementing a digital post distortion model based at least in part on the power amplifier model of the transmitter antenna; and
    performing digital post distortion processing on signals received from the network device based at least in part on the digital post distortion model.

12. An apparatus for wireless communication at a user equipment (UE), comprising:
   a processor;
   memory coupled with the processor; and
   instructions stored in the memory and executable by the processor to cause the apparatus to:
      receive, from a network device, an indication of a power amplifier model for each antenna group of a plurality of antenna groups, each antenna group being associated with a respective set of transmitter antennas of the network device and a power amplifier response of each transmitter antenna;
      determine a power amplifier model for a transmitter antenna of the set of transmitter antennas based at least in part on the indication of the power amplifier model for an antenna group of the plurality of antenna groups and the transmitter antenna being associated with the antenna group; and
      communicate with the network device based at least in part on the power amplifier model for the transmitter antenna.

13. The apparatus of claim 12, wherein the instructions to receive the indication of the power amplifier model for each antenna group are executable by the processor to cause the apparatus to:
   receive a first reference signal for a first antenna group of the plurality of antenna groups and a second reference signal for a second antenna group of the plurality of antenna groups, wherein communicating with the network device is based at least in part on the receiving.

14. The apparatus of claim 13, wherein the instructions are further executable by the processor to cause the apparatus to:
   determine a first power amplifier model for the first antenna group based at least in part on the first reference signal and a second power amplifier model for the second antenna group based at least in part on the second reference signal; and
   apply the first power amplifier model to each transmitter antenna mapped to the first antenna group and the second power amplifier model to each transmitter antenna mapped to the second antenna group, wherein communicating with the network device is based at least in part on the applying.

15. The apparatus of claim 13, wherein the first reference signal, or the second reference signal, or both comprise a respective demodulation reference signal.

16. The apparatus of claim 12, wherein the instructions to receive the indication of the power amplifier model for each antenna group are executable by the processor to cause the apparatus to:
   receive, from the network device, each power amplifier model for each antenna group of the plurality of antenna groups, wherein the indication of the power amplifier model is received in a radio resource control message, and wherein communicating with the network device is based at least in part on the receiving.

17. The apparatus of claim 16, wherein the instructions are further executable by the processor to cause the apparatus to:
   determine that the indication of the power amplifier model indicates which transmitter antennas are associated with each antenna group of the plurality of antenna groups and which of the power amplifier models to use for each antenna group, or indicates which of the power amplifier models to use with each antenna group of the plurality of antenna groups for a given temperature, or indicates both, wherein communicating with the network device is based at least in part on the determining.

18. The apparatus of claim 12, wherein the instructions are further executable by the processor to cause the apparatus to:
   determine that the indication of the power amplifier model indicates a link between a first power amplifier model of a first antenna group of the plurality of antenna groups and a first set of one or more antenna rows of a precoding matrix, and indicates a link between a second power amplifier model of a second antenna group of the plurality of antenna groups and a second set of one or more antenna rows of the precoding matrix, wherein communicating with the network device is based at least in part on the determining.

19. The apparatus of claim 12, wherein the instructions are further executable by the processor to cause the apparatus to:
   determine that the indication of the power amplifier model indicates, from a set of one or more linking patterns preconfigured on the UE, a preconfigured linking pattern that links a first power amplifier model of a first antenna group of the plurality of antenna groups with a first set of one or more antenna rows of a precoding matrix, and links a second power amplifier model of a second antenna group of the plurality of antenna groups with a second set of one or more antenna rows of the precoding matrix, wherein communicating with the network device is based at least in part on the determining.

20. The apparatus of claim 12, wherein the instructions are further executable by the processor to cause the apparatus to:
   determine that the indication of the power amplifier model indicates a first list of kernels associated with a first power amplifier model of a first antenna group of the plurality of antenna groups, and a second list of kernels associated with a second power amplifier model of a second antenna group of the plurality of antenna groups, wherein communicating with the network device is based at least in part on the determining.

21. The apparatus of claim 12, wherein the instructions are further executable by the processor to cause the apparatus to:
   determine that the indication of the power amplifier model indicates a matrix of basis functions respectively associated with the plurality of antenna groups, wherein communicating with the network device is based at least in part on the determining.

22. The apparatus of claim 12, wherein the instructions are further executable by the processor to cause the apparatus to:
   implement a digital post distortion model based at least in part on the power amplifier model of the transmitter antenna; and
   perform digital post distortion processing on signals received from the network device based at least in part on the digital post distortion model.

23. A non-transitory computer-readable medium storing code for wireless communication, the code comprising instructions executable by one or more processors to:
   receive, from a network device, an indication of a power amplifier model for each antenna group of a plurality of antenna groups, each antenna group being associated with a respective set of transmitter antennas of the network device and a power amplifier response of each transmitter antenna;

determine a power amplifier model for a transmitter antenna of the set of transmitter antennas based at least in part on the indication of the power amplifier model for an antenna group of the plurality of antenna groups and the transmitter antenna being associated with the antenna group; and communicate with the network device based at least in part on the power amplifier model for the transmitter antenna.

24. The non-transitory computer-readable medium of claim 23, wherein the instructions to receive the indication of the power amplifier model for each antenna group are further executable to:

receive a first reference signal for a first antenna group of the plurality of antenna groups and a second reference signal for a second antenna group of the plurality of antenna groups, wherein communicating with the network device is based at least in part on the receiving.

25. The non-transitory computer-readable medium of claim 24, wherein the instructions further executable to:

determine a first power amplifier model for the first antenna group based at least in part on the first reference signal and a second power amplifier model for the second antenna group based at least in part on the second reference signal; and apply the first power amplifier model to each transmitter antenna mapped to the first antenna group and the second power amplifier model to each transmitter antenna mapped to the second antenna group, wherein communicating with the network device is based at least in part on the applying.

26. The non-transitory computer-readable medium of claim 24, wherein the first reference signal, or the second reference signal, or both comprise a respective demodulation reference signal.

27. A user equipment (UE) for wireless communication, comprising:

means for receiving, from a network device, an indication of a power amplifier model for each antenna group of a plurality of antenna groups, each antenna group being associated with a respective set of transmitter antennas of the network device and a power amplifier response of each transmitter antenna;

means for determining a power amplifier model for a transmitter antenna of the set of transmitter antennas based at least in part on the indication of the power amplifier model for an antenna group of the plurality of antenna groups and the transmitter antenna being associated with the antenna group; and means for communicating with the network device based at least in part on the power amplifier model for the transmitter antenna.

28. The UE of claim 27, wherein the means for receiving the indication of the power amplifier model for each antenna group further comprises:

means for receiving a first reference signal for a first antenna group of the plurality of antenna groups and a second reference signal for a second antenna group of the plurality of antenna groups, wherein communicating with the network device is based at least in part on the receiving.

29. The UE of claim 28, further comprising:

means for determining a first power amplifier model for the first antenna group based at least in part on the first reference signal and a second power amplifier model for the second antenna group based at least in part on the second reference signal; and means for applying the first power amplifier model to each transmitter antenna mapped to the first antenna group and the second power amplifier model to each transmitter antenna mapped to the second antenna group, wherein communicating with the network device is based at least in part on the applying.

30. The UE of claim 28, wherein the first reference signal, or the second reference signal, or both comprise a respective demodulation reference signal.

* * * * *